(12) United States Patent
Bharadia et al.

(10) Patent No.: US 11,163,050 B2
(45) Date of Patent: Nov. 2, 2021

(54) BACKSCATTER ESTIMATION USING PROGRESSIVE SELF INTERFERENCE CANCELLATION

(71) Applicant: The Board of Trustees of the Leland Stanford Junior University, Palo Alto, CA (US)

(72) Inventors: Dinesh Bharadia, Menlo Park, CA (US); Kiran Joshi, Sunnyvale, CA (US); Sachin Katti, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 121 days.

(21) Appl. No.: 15/033,889

(22) PCT Filed: Nov. 14, 2014

(86) PCT No.: PCT/US2014/065814
§ 371 (c)(1),
(2) Date: May 2, 2016

(87) PCT Pub. No.: WO2015/073905
PCT Pub. Date: May 21, 2015

(65) Prior Publication Data
US 2016/0266245 A1    Sep. 15, 2016

Related U.S. Application Data

(60) Provisional application No. 61/904,428, filed on Nov. 14, 2013.

(51) Int. Cl.
*G01S 13/00* (2006.01)
*G01S 7/03* (2006.01)
(Continued)

(52) U.S. Cl.
CPC ............ *G01S 13/003* (2013.01); *G01S 7/038* (2013.01); *G01S 7/292* (2013.01); *G01S 13/42* (2013.01)

(58) Field of Classification Search
CPC ........................................ G01S 7/038
(Continued)

(56) References Cited

U.S. PATENT DOCUMENTS 3,852,742 A    12/1974  Fletcher
3,922,617 A    11/1975  Denniston
(Continued)

FOREIGN PATENT DOCUMENTS

EP    0755141 A2    1/1997
EP    1959625 B1    2/2009
(Continued)

OTHER PUBLICATIONS

Tse et al., "Fundamentals of Wireless Communications," Aug. 13, 2004. [Retrieved from the Internet Oct. 25, 2016: www.eecs.berkeley.edu/~dtse/main.pdf].
(Continued)

*Primary Examiner* — Erin F Heard
*Assistant Examiner* — Helena H Seraydaryan
(74) *Attorney, Agent, or Firm* — Alston & Bird LLP

(57) ABSTRACT

Techniques for estimating one or more backscatter signals reflected from one or more objects are disclosed. In one example, a backscatter sensor includes, in part, a receiver for receiving a composite signal comprising one or more reflections of a transmitted signal, each reflection being reflected by one of a plurality of objects; and a processor configured to estimate at least a first backscatter component of the composite signal using a progressive interference cancellation technique. The first backscatter component of the composite signal corresponds to a reflection of the transmitted
(Continued)

signal from a first object. In one embodiment, the backscatter sensor includes multiple receivers and/or one or more transmitters.

27 Claims, 8 Drawing Sheets

(51) Int. Cl.
    *G01S 13/42* (2006.01)
    *G01S 7/292* (2006.01)
(58) Field of Classification Search
    USPC ......................................................... 342/159
    See application file for complete search history.

(56) References Cited

U.S. PATENT DOCUMENTS

| | | |
|---|---|---|
| 4,053,885 A | 10/1977 | Tomita |
| 4,173,017 A | 10/1979 | Burlage |
| 4,287,579 A | 9/1981 | Inoue et al. |
| 4,324,258 A | 4/1982 | Huebscher et al. |
| 4,885,590 A | 12/1989 | Hasan |
| 4,952,193 A | 8/1990 | Talwar |
| 5,061,934 A | 10/1991 | Brown et al. |
| 5,188,112 A | 2/1993 | Sturgill et al. |
| 5,212,827 A | 5/1993 | Meszko et al. |
| 5,444,864 A | 8/1995 | Smith |
| 5,691,978 A | 11/1997 | Kenworthy |
| 5,734,967 A | 3/1998 | Kotzin et al. |
| 5,790,658 A | 8/1998 | Yip et al. |
| 5,818,383 A | 10/1998 | Stockburger et al. |
| 5,883,597 A | 3/1999 | DeWulf |
| 5,930,301 A | 7/1999 | Chester et al. |
| 6,069,583 A | 5/2000 | Silvestrin |
| 6,198,427 B1 | 3/2001 | Aker et al. |
| 6,215,812 B1 | 4/2001 | Young et al. |
| 6,400,306 B1 | 6/2002 | Nohara et al. |
| 6,411,250 B1 | 6/2002 | Oswald et al. |
| 6,498,581 B1 | 12/2002 | Yu |
| 6,539,204 B1 | 3/2003 | Marsh et al. |
| 6,567,649 B2 | 5/2003 | Souissi |
| 6,639,551 B2 | 10/2003 | Li et al. |
| 6,725,017 B2 | 4/2004 | Blount et al. |
| 6,745,018 B1 | 6/2004 | Zehavi et al. |
| 6,965,657 B1 | 11/2005 | Rezvani et al. |
| 7,215,976 B2 | 5/2007 | Brideglall |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,460,615 B2 | 12/2008 | Kunysz |
| 7,564,396 B2 | 7/2009 | Van Veldhoven et al. |
| 7,869,527 B2 | 1/2011 | Vetter et al. |
| 8,005,235 B2 | 8/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,242,888 B2 | 8/2012 | Tuttle |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,633,805 B2 | 1/2014 | Tuttle |
| 8,755,756 B1 | 6/2014 | Zhang et al. |
| 8,830,123 B2 | 9/2014 | Rao |
| 8,995,410 B2 | 3/2015 | Balan et al. |
| 9,042,838 B2 | 5/2015 | Braithwaite |
| 9,054,795 B2 | 6/2015 | Choi et al. |
| 9,065,519 B2 | 6/2015 | Cyzs et al. |
| 9,077,421 B1 | 7/2015 | Mehlman et al. |
| 9,124,475 B2 | 9/2015 | Li et al. |
| 9,184,902 B2 | 11/2015 | Khojastepour et al. |
| 9,246,554 B2 | 1/2016 | Maguire |
| 9,325,432 B2 | 4/2016 | Hong et al. |
| 9,357,341 B2 | 5/2016 | Deyle |
| 9,367,711 B1 | 6/2016 | Dacus et al. |
| 9,441,966 B2 | 9/2016 | Ruizenaar |
| 9,887,728 B2 | 2/2018 | Jain et al. |
| 9,927,519 B1 | 3/2018 | Omer et al. |
| 10,142,822 B1 | 11/2018 | Zalewski et al. |
| 10,338,205 B2 | 7/2019 | Zhang et al. |
| 2002/0064245 A1 | 5/2002 | McCorkle |
| 2003/0031279 A1 | 2/2003 | Blount et al. |
| 2003/0053659 A1 | 3/2003 | Pavlidis et al. |
| 2003/0099287 A1 | 5/2003 | Arambepola |
| 2003/0148748 A1 | 8/2003 | Shah |
| 2004/0106381 A1 | 6/2004 | Tiller |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0253688 A1 | 11/2005 | Fukuda |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0044114 A1 | 3/2006 | Friedrich et al. |
| 2006/0044147 A1 | 3/2006 | Knox et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2007/0003141 A1 | 1/2007 | Rittscher et al. |
| 2007/0018722 A1 | 1/2007 | Jaenecke |
| 2007/0105509 A1 | 5/2007 | Muhammad et al. |
| 2007/0171119 A1 | 7/2007 | Dwelly et al. |
| 2007/0207747 A1 | 9/2007 | Johnson et al. |
| 2007/0223617 A1 | 9/2007 | Lee et al. |
| 2007/0249314 A1 | 10/2007 | Sanders et al. |
| 2007/0274372 A1 | 11/2007 | Asai et al. |
| 2008/0004796 A1 | 1/2008 | Schott et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0129581 A1 | 6/2008 | Douglass et al. |
| 2008/0129584 A1 | 6/2008 | Antonik et al. |
| 2008/0131133 A1 | 6/2008 | Blunt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2008/0255911 A1 | 10/2008 | Khosia |
| 2008/0278293 A1 | 11/2008 | Drucker |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0147837 A1 | 6/2009 | Lau |
| 2009/0180404 A1 | 7/2009 | Jung et al. |
| 2009/0186582 A1 | 7/2009 | Muhammad et al. |
| 2009/0221231 A1 | 9/2009 | Weng et al. |
| 2009/0262005 A1 | 10/2009 | McNeill et al. |
| 2009/0303004 A1 | 12/2009 | Tuttle |
| 2009/0303908 A1 | 12/2009 | Deb et al. |
| 2009/0305650 A1 | 12/2009 | Wenger et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0152600 A1 | 6/2010 | Droitcour et al. |
| 2010/0156610 A1 | 6/2010 | Wild et al. |
| 2010/0159837 A1 | 6/2010 | Dent et al. |
| 2010/0159858 A1 | 6/2010 | Dent et al. |
| 2010/0215124 A1 | 8/2010 | Zeong et al. |
| 2010/0226416 A1* | 9/2010 | Dent .................. H04L 25/0202 375/219 |

(56) References Cited

U.S. PATENT DOCUMENTS

| | | | |
|---|---|---|---|
| 2010/0226448 A1* | 9/2010 | Dent | H04L 25/0202 375/260 |
| 2010/0232324 A1 | 9/2010 | Radunovic et al. | |
| 2010/0240999 A1 | 9/2010 | Droitcour et al. | |
| 2010/0249630 A1 | 9/2010 | Droitcour et al. | |
| 2010/0249633 A1 | 9/2010 | Droitcour et al. | |
| 2010/0279602 A1 | 11/2010 | Larsson et al. | |
| 2010/0292568 A1 | 11/2010 | Droitcour et al. | |
| 2010/0295716 A1 | 11/2010 | Yamaki et al. | |
| 2011/0013684 A1 | 1/2011 | Semenov et al. | |
| 2011/0026509 A1 | 2/2011 | Tanaka | |
| 2011/0080264 A1 | 4/2011 | Clare et al. | |
| 2011/0149714 A1 | 6/2011 | Rimini et al. | |
| 2011/0171922 A1 | 7/2011 | Kim et al. | |
| 2011/0216813 A1 | 9/2011 | Baldemair et al. | |
| 2011/0222631 A1 | 9/2011 | Jong | |
| 2011/0243202 A1* | 10/2011 | Lakkis | H04B 1/525 375/219 |
| 2011/0256857 A1 | 10/2011 | Chen et al. | |
| 2011/0268232 A1 | 11/2011 | Park et al. | |
| 2011/0311067 A1 | 12/2011 | Harris et al. | |
| 2011/0319044 A1 | 12/2011 | Bornazyan | |
| 2012/0021153 A1 | 1/2012 | Bhandari et al. | |
| 2012/0032843 A1 | 2/2012 | Lee et al. | |
| 2012/0063369 A1 | 3/2012 | Lin et al. | |
| 2012/0063373 A1 | 3/2012 | Chincholi et al. | |
| 2012/0140685 A1 | 6/2012 | Lederer et al. | |
| 2012/0147790 A1 | 6/2012 | Khojastepour et al. | |
| 2012/0154249 A1 | 6/2012 | Khojastepour et al. | |
| 2012/0155335 A1 | 6/2012 | Khojastepour et al. | |
| 2012/0155336 A1 | 6/2012 | Khojastepour et al. | |
| 2012/0161931 A1 | 6/2012 | Karmakar et al. | |
| 2012/0201153 A1 | 8/2012 | Bharadia et al. | |
| 2012/0201173 A1 | 8/2012 | Jain et al. | |
| 2012/0268253 A1 | 10/2012 | Tuttle | |
| 2012/0309454 A1 | 12/2012 | Maguire | |
| 2012/0319819 A1 | 12/2012 | Tkachenko | |
| 2012/0321006 A1 | 12/2012 | Akita et al. | |
| 2013/0005284 A1 | 1/2013 | Dalipi | |
| 2013/0044791 A1 | 2/2013 | Rimini et al. | |
| 2013/0089009 A1 | 4/2013 | Li et al. | |
| 2013/0102254 A1 | 4/2013 | Cyzs et al. | |
| 2013/0113647 A1 | 5/2013 | Sentelle et al. | |
| 2013/0114468 A1 | 5/2013 | Hui et al. | |
| 2013/0155913 A1 | 6/2013 | Sarca | |
| 2013/0166259 A1 | 6/2013 | Weber et al. | |
| 2013/0194419 A1 | 8/2013 | Bhowmick et al. | |
| 2013/0194984 A1 | 8/2013 | Cheng et al. | |
| 2013/0215805 A1 | 8/2013 | Hong et al. | |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0301379 A1 | 10/2014 | Shoarinejad | |
| 2014/0348018 A1 | 11/2014 | Bharadia et al. | |
| 2015/0091706 A1 | 4/2015 | Chemishkian et al. | |
| 2015/0156003 A1 | 6/2015 | Khandani | |
| 2015/0156004 A1 | 6/2015 | Khandani | |
| 2016/0092706 A1 | 3/2016 | Deyle | |
| 2016/0226653 A1 | 8/2016 | Bharadia et al. | |
| 2016/0234005 A1 | 8/2016 | Hong et al. | |
| 2016/0365890 A1 | 12/2016 | Reynolds et al. | |
| 2017/0090026 A1 | 3/2017 | Joshi et al. | |
| 2017/0264420 A1 | 9/2017 | Bharadia et al. | |
| 2018/0375703 A1 | 12/2018 | Kellogg et al. | |
| 2019/0074973 A1 | 3/2019 | Hadaschik et al. | |
| 2019/0274144 A1 | 9/2019 | Zhang et al. | |

FOREIGN PATENT DOCUMENTS

| | | |
|---|---|---|
| EP | 2237434 A1 | 10/2010 |
| EP | 2267946 A2 | 12/2010 |
| JP | 2001-196994 A | 7/2001 |
| JP | 2004-56315 A | 2/2004 |
| RU | 2256985 C2 | 7/2005 |
| WO | WO 2009/106515 A1 | 9/2009 |
| WO | WO 10/132850 A1 | 11/2010 |
| WO | WO 2012/106262 A1 | 8/2012 |
| WO | WO 2012/106263 A1 | 8/2012 |
| WO | WO 2013/185106 A1 | 12/2013 |
| WO | WO 2014/093916 A1 | 6/2014 |
| WO | WO 2014/121290 A1 | 8/2014 |
| WO | WO 2015/021481 A2 | 2/2015 |
| WO | WO 2015/048678 A1 | 4/2015 |
| WO | WO 2015/073905 A2 | 5/2015 |
| WO | WO 2015/168700 A1 | 11/2015 |
| WO | WO 2017/132400 A1 | 8/2017 |

OTHER PUBLICATIONS

Italian National Research Council, "Dielectric Properties of Body Tissues." [Retrieved from the Internet Oct. 25, 2016: http://niremf.ifac.cnr.it/tissprop/].

FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Boyd, "Sequential Convex Programming." [Retrieved from the Internet Oct. 26, 2016: http://www.stanford.edu/class/ ee364b/lectures/seq_slides.pdf].

Wikipedia, "Star Trek Tricoder," [Retrieved from the Internet Oct. 26, 2016: http://en.wikipedia.org/wiki/Tricorder].

Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).

Bharadia et al., "Full Duplex Radios," In Proceedings of the ACM SIGCOMM 2013 conference on SIGCOMM, SIGCOMM '13, pp. 375-386, ACM, New York, NY, USA, (2013).

Bindu et al., "Active microwave imaging for breast cancer detection," Progress in Electromametics Research, vol. 58: 149-169, (2006).

Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/.../wholebodyimaging.pdf].

Duarte et al., "Experiment-driven Characterization of Full-Duplex Wireless Systems," (2011). [Retrieved from the Internet Oct. 25, 2016: https://arxiv.org/abs/1107.1276].

Duarte et al., "Full-Duplex Wireless Communications Using Off-The-Shelf Radios: Feasibility and First Results," In Forty-Fourth Asilomar Conference on Signals, Systems, and Components, (2010).

Erceg et al., "TGn channel models," Tech. Rep. IEEE P802.11, Wireless LANs, Garden Grove, Calif, USA, (2004).

Fear et al., "Enhancing Breast Tumor Detection with Near-Field Imaging," Microwave Magazine, IEEE, 3(1):48-56, (2002).

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fleury et al., "Channel Parameter Estimation in Mobile Radio Environments Using the SAGE Algorithm," IEEE Journal on Selected Areas in Communications, 17(3):434-450, (1999).

Guo et al., "Microwave Imaging via Adaptive Beamforming Methods for Breast Cancer Detection," Progress in Electromagnetics Research, vol. 1, 350-353, (2005).

Hong et al., "Picasso: Flexible RF and Spectrum Slicing," In Proceedings of the ACM SIGCOMM 2012 conference on Applica-

(56) References Cited

OTHER PUBLICATIONS

*tions, technologies, architectures, and protocols for computer communication*, SIGCOMM '12, pp. 283-284, ACM, Helsinki, Finland, (2012).

Jain et al., "Practical, Real-time, Full Duplex Wireless," MobiCom '11, pp. 301-312, ACM, New York, NY, USA, (2011).

Sahai et al., "On the Impact of Phase Noise on Active Cancellation in Wireless Full-Duplex," (2012). [Retrieved from the Internet Oct. 25, 2016: https://arxiv.org/pdf/1212.5462].

Sundstrom et al., "Power Dissipation Bounds for High-Speed Nyquist Analog-to-Digital Converters," *IEEE Transactions on Circuits and Systems I: Regular Papers*, 56(3):509-518, (2009).

Surowiec et al., "Dielectric Properties of Breast Carcinoma and the Surrounding Tissues," *IEEE Transactions on Biomedical Engineering*, 35(4):257-263, (1988).

Xiong et al., "ArrayTrack: A Fine-Grained Indoor Location System" In *Proceedings of the 10th USENIX conference on Networked Systems Design and Implementation*, nsdi'13, pp. 71-84, USENIX Association, Berkeley, CA, USA, (2013).

Zhang et al., "A novel method for microwave breast cancer detection," *Progress in Electromagnetics Research*, vol. 83: 413-434, (2008).

Ekanadham, "Continuous Basis Pursuit and Its Applications," PhD thesis, New York, NY, USA, AAI3546394, (2012).

Tibshirani, "Regression shrinkage and selection via the lasso," *Journal of the Royal Statistical Society, Series B (Methodological)*, pp. 267-288 (1996).

PCT International Search Report and Written Opinion of the International Searching Authority for application PCT/US2014/065814 dated Feb. 19, 2015.

PCT International Preliminary Report on Patentability for application PCT/US2014/065814 dated May 17, 2016.

Adib, et al., "3D Tracking via Body Radio Reflections," Proceedings of the 11th USENIX Symposium on Networked Systems Design and Implementation, pp. 317-329, (2014).

Archer, et al., "Interface Contracts for TinyOS," IPSN '07: Proceedings of the 6th international conference on Information processing in sensor networks, pp. 158-165 (2007).

Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).

Bardwell, "Tech Report." [Retrieved from the Internet Dec. 3, 2016: <http://www.connect802.com/download/techpubs/2005/commercial_radios_E052315.pdf>].

Bharadia, "Full Duplex Backscatter," Proceedings of the 12th ACM Workshop on Hot Topics in Networks, 7 pages, ACM, (2013).

Bicket, "Bit-rate Selection in Wireless Networks," Master's thesis, MIT, 2005.

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

Bortz, et al., "The Simplex Gradient and Noisy Optimization Problems," North Carolina State University, Department of Mathematics, Center for Research in Scientific Computation, (1998).

Boyd, Sequential Convex Programming, [Retrieved from the Internet May 8, 2017: <http://stanford.edu/class/ee364b/lectures/seq_slides.pdf>].

Briggs, et al., "Power Measurements of OFDM Signals," IEEE Symposium on Electromagnetic Compatibility, (2004).

Burlingame, et al., "An Analog CMOS High-Speed Continuous-Time FIR Filter," Solid-State Circuits Research Laboratory, Department of Electrical and Computer Engineering, University of California, Davis, CA, (2000).

Chandra, "A Case for Adapting Channel Width in Wireless Networks," ACM SIGCOMM, (2008).

Choi, et al., "Granting Silence to Avoid Wireless Collisions," Proceedings of the 18th International Conference on Network Protocols (ICNP), (2010).

Choi, et al., IEEE"E802.11e Contention-Based Channel Access (EDCF) Performance Evaluation," IEEE ICC (2003).

Choi, et al., "The Case for a Network Protocol Isolation Layer," Sensys '09: Proceedings of the 7th ACM Conference on Embedded networked sensor systems (SenSys), pp. 267-280, (2009).

Chu, et al., "The Design and Implementation of a Declarative Sensor Network System," Proceedings of the 5th international conference on Embedded networked sensor systems, (2007).

Coffman, et al., "Channel Fragmentation in Dynamic Spectrum Access Systems—a Theoretical Study," ACM SIGMETRICS, (2010).

Culler, et al., "Towards a Sensor Network Architecture: Lowering the Waistline," Proceedings of the Tenth Workshop on Hot Topics in Operating Systems (HotOS-X), (2005).

Ding, "Digital Predistortion of Power Amplifiers for Wireless Applications," Ph.D Thesis, School of Electrical and Computer Engineering, Georgia Institute of Technology, (Mar. 2004).

Duarte, "Experiment-driven Characterization of Full-Duplex Wireless Systems," CoRR, abs/1107.1276, (2011).

Elhamifar et al., "Sparse Subspace Clustering: Algorithm, Theory, and Applications, IEEE Transactions on Pattern Analysis and Machine Intelligence," 35(11):2765-2781, (2013).

Ettus Research, UHD Daughterboard Application Notes. [Retrieved from the Internet Dec. 8, 2016: <http://files.ettus.com/uhd_docs/manual/html/dboards.html>].

Ettus Research, Universal Software Radio Peripheral (USRP). [Retrieved from the Internet Dec. 3, 2016: <http://www.ettus.com>].

Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).

Everett, et al., "Passive Self-Interference Suppression for Full-Duplex Infrastructure Nodes," CoRR, abs/1302.2185, (2013).

FCC, Table of Frequency Allocations. [Retrieved from the Internet Dec. 3, 2016: <http://transition.fcc.gov/oet/spectrum/table/fcctable.pdf>].

Gember, et al., "A Comparative Study of Handheld and Non-Handheld Traffic in Campus Wi-Fi Networks," Passive and Active Measurement Conf., (2011).

Gheorma, et al., "Rf Photonic Techniques for Same Frequency Simultaneous Duplex Antenna Operation," IEEE Photonics Technology Letters, 19(13): 1014-1016, (2007).

Gill, Slide Presentation: "RF performance of mobile terminals—a challenge for the industry," Cambridge Wireless Radio Technology Special Interest Group (SIG), (2011).

Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].

Gnawali, et al., "Collection Tree Protocol," Proceedings of the 7th ACM Conference on Embedded Networked Sensor Systems (SenSys), pp. 1-14 (2009).

Goldsmith, "Wireless Communications," Cambridge University Press, (2004).

Gollakota, et al., "They Can Hear Your Heartbeats: Non-Invasive Security for Implantable Medical Devices," SIGCOMM Comput. Commun. Rev., 41(4), (Aug. 2011).

Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).

Gummadi, et al., "Understanding and Mitigating the Impact of RF Interference on 802.11 Networks," Proceedings of the 2007 conference on Applications, technologies, architectures, and protocols for computer communications (SIGCOMM), (2007).

(56) References Cited

OTHER PUBLICATIONS

Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al, "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Iyer, et al., "Specnet: Spectrum Sensing Sans Frontiers," USENIX NSDI, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Joshi, et al, "Pinpoint: Localizing interfering radios," Proceedings of the 10th USENIX Conference on Networked Systems Design and Implementation, NSDI '13, pp. 241-254, (2013).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Kuhn, "The Hungarian Method for the Assignment Problem," Naval Research Logistics Quarterly 2, 2:83-97, (1955). [Retrieved from the Internet May 8, 2017: <https://tom.host.cs.st-andrews.ac.uk/CS3052-CC/Practicals/Kuhn.pdf>].
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Mattingly, et al., "CVXGEN: a code generator for embedded convex optimization," Optimization and Engineering, 13(1):1-27, (2012). [Retrieved from the Internet May 9, 2017: <http://stanford.edu/~boyd/papers/pdf/code_gen_impl.pdf>].
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Pu, et al., "Whole-Home Gesture Recognition Using Wireless Signals," Proceedings of the 19th Annual International Conference on Mobile Computing & Networking, MobiCom '13, pp. 27-38, (2013). [Retrieved from the Internet May 9, 2017: https://wisee.cs.washington.edu/wisee_paper.pdf].
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Ralston, et al., Real-time Through-wall Imaging Using an Ultrawideband Multiple-Input Multiple-Output (MIMO) Phased Array Radar System, 2010 IEEE Symposium on Phased Array Systems and Technology (ARRAY), pp. 551-558, (2010).
Remcom, "Modeling Indoor Propagation." [Retrieved from the Internet May 8, 2017: http://www.remcom.com/examples/modeling-indoor-propagation.html].
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec.

(56) References Cited

OTHER PUBLICATIONS 10, 2016: <https://cdn.rohde-schwarz.com/pws/dl_downloads/dl_common_library/dl_manuals/gb_1/f/fsw_1/FSW_UserManual_en_26.pdf>].

Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].

Sahai, et al., "On the Impact of Phase Noise on Active Cancellation in Wireless Full-Duplex," CoRR, abs/1212.5462, (2012).

Sahai, et al., "Spectrum Sensing: Fundamental limits," draft chapter for a Springer Book: Cognitive Radios: System Design Perspective, (Jun. 2009).

Sen, et al., "AccuRate: Constellation Based Rate Estimation in Wireless Networks," Proceedings of the Seventh USENIX Symposium on Networked Systems Design and Implementation (NSDI), (2010).

Sen, et al., "CSMA/CN: Carrier Sense Multiple Access with Collision Notification," Proceedings of the 16th annual international conference on Mobile computing and networking (MobiCom), pp. 25-36, (2010).

Shen, et al., "Channel Estimation in OFDM Systems," Application Note, Freescale Semiconductor, (2006).

Srinivasan, et al., "An Empirical Study of Low-Power Wireless," ACM Transactions on Sensor Networks, 6(2):1-49, (2010).

Srinivasan, et al., "RSSI is Under Appreciated," Proceedings of the Third Workshop on Embedded Networked Sensors (EmNets), (2006).

Srinivasan, et al., "Some Implications of Low Power Wireless to IP Networking," Proceedings of the Fifth Workshop on Hot Topics in Networks (HotNets-V), (Nov. 2006).

Srinivasan, et al., "The κ-Factor: Inferring Protocol Performance Using Inter-Link Reception Correlation," Proceedings of the 16th annual international conference on Mobile computing and networking (MobiCom), (2010).

Srinivasan, et al., The β-factor: Measuring Wireless Link Burstiness, Proceedings of the Sixth ACM Conference on Embedded Networked Sensor Systems, (Nov. 2008).

Tan, et al., "Fine Grained Channel Access in Wireless LAN," ACM SIGCOMM, (2010).

Tan, et al., "Spectrum Virtualization Layer," MSR Tech Report, (2011). [Retrieved from the Internet Dec. 8, 2016: <http://research.microsoft.com/apps/pubs/default.aspx?id=154410>].

Tavakoli, et al., "A Declarative Sensornet Architecture," Proceedings of the International Workshop on Wireless Sensornet Architecture (WWSNA), (2007).

Tomlinson, "New Automatic Equaliser Employing Modulo Arithmetic," Electronic Letters, 7(5/6):138-139, (1971).

Tourrilhes, "Fragment Adaptive Reduction: Coping with Various interferers in radio unlicensed bands," IEEE IC, (2001).

Van De Beek, et al., "On Channel Estimation in OFDM Systems," IEEE 45th Vehicular Technology Conference, vol. 2, pp. 815-819, (1995).

Vutukuru, et al., "Cross-Layer Wireless Bit Rate Adaption," SIGCOMM Comput. Commun. Rev., 39(4):3-14, (2009).

Weingarten, et al., "The Capacity Region of the Gaussian Multiple-Input Multiple-Output Broadcast Channel," IEEE Transactions on Information Theory, 52(9):3936-3964, (2006).

Welch, et al., "An Introduction to the Kalman Filter," Technical report, Chapel Hill, NC, USA, (2006). [Retrieved from the Internet May 9, 2017: <https://www.cs.unc.edu/~welch/media/pdf/kalman_intro.pdf>].

Wi-Fi Alliance, WiFi Direct Industry White Paper, (2010). [Retrieved from the Internet Dec. 13, 2016: <http://www.wi-fi.org/discover-wi-fi/wi-fi-direct>].

Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].

Wischik, et al., "Design, implementation and evaluation of congestion control for multipath TCP," USENIX NSDI, (2011).

Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].

Xilinx, UG193: XtremeDSP User Guide, (Jan. 26, 2012). [Retrieved from the Internet Dec. 6, 2016: <https://www.xilinx.com/support/documentation/user_guides/ug193.pdf>].

Yang, et al., "Supporting Demanding Wireless Applications with Frequency-agile Radios," USENIX NSDI, (2010).

Yang, et al., "The Spaces Between Us: Sensing and Maintaining Boundaries in Wireless Spectrum Access," ACM MOBICOM, (2010).

Yoo, et al., "On the Optimality of Multiantenna Broadcast Scheduling Using Zero-Forcing Beamforming," IEEE Journal on Selected Areas in Communications, 24(3):528-541, (2006).

Yuan, et al., "KNOWS: Kognitiv Networking Over White Spaces," IEEE DySPAN, (2007).

Zhang, et al., "Gain/Phase Imbalance-Minimization Techniques for LINC Transmitters," IEEE Transactions on Microwave Theory and Techniques, 49(12):2507-2516, (2001).

Chinese Application No. 201380041721.0, First Office Action dated Nov. 18, 2015.

EPO Application No. 20130801200, Supplementary European Search Report dated Feb. 4, 2016.

PCT International Preliminary Report on Patentablility for application PCT/US2012/023183 dated Aug. 6, 2013.

PCT International Preliminary Report on Patentablility for application PCT/US2012/023184 dated Aug. 6, 2013.

PCT International Preliminary Report on Patentablility for application PCT/US2013/044830 dated Dec. 9, 2014.

PCT International Preliminary Report on Patentablility for application PCT/US2013/075166 dated Jun. 16, 2015.

PCT International Preliminary Report on Patentablility for application PCT/US2014/014726 dated Aug. 4, 2015.

PCT International Preliminary Report on Patentablility for application PCT/US2014/050584 dated Feb. 9, 2016.

PCT International Preliminary Report on Patentablility for application PCT/US2014/058117 dated Mar. 29, 2016.

PCT International Search Report and Written Opinion of the International Searching Authority for application PCT/US2012/023183 dated May 17, 2012.

PCT International Search Report and Written Opinion of the International Searching Authority for application PCT/US2012/023184 dated May 7, 2012.

PCT International Search Report and Written Opinion of the International Searching Authority for application PCT/US2013/075166 dated Apr. 22, 2014.

PCT International Search Report and Written Opinion of the International Searching Authority for application PCT/US2014/014726 dated Jun. 2, 2014.

PCT International Search Report and Written Opinion of the International Searching Authority for application PCT/US2014/050584 dated Jan. 21, 2015.

PCT International Search Report and Written Opinion of the International Searching Authority for application PCT/US2014/058117 dated Dec. 30, 2014.

PCT International Search Report for application PCT/US2013/044830 dated Sep. 26, 2013.

PCT Written Opinion of the International Searching Authority for application PCT/US2013/044830 dated Sep. 26, 2013.

U.S. Appl. No. 13/293,069, Advisory Action dated Aug. 29, 2017.
U.S. Appl. No. 13/293,069, Final Office Action dated May 2, 2017.
U.S. Appl. No. 13/293,069, Final Office Action dated Jun. 8, 2016.
U.S. Appl. No. 13/293,069, Final Office Action dated Oct. 21, 2014.
U.S. Appl. No. 13/293,069, Non-Final Office Action dated Jan. 6, 2017.
U.S. Appl. No. 13/293,069, Non-Final Office Action dated May 1, 2014.
U.S. Appl. No. 13/293,069, Non-Final Office Action dated Jul. 17, 2013.

(56) References Cited

OTHER PUBLICATIONS

U.S. Appl. No. 13/293,069, Non-Final Office Action dated Sep. 21, 2015.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Final Office Action dated Mar. 15, 2016.
U.S. Appl. No. 13/293,072, Final Office Action dated Aug. 3, 2017.
U.S. Appl. No. 13/293,072, Final Office Action dated Mar. 31, 2014.
U.S. Appl. No. 13/293,072, Non-Final Office Action dated Jan. 13, 2017.
U.S. Appl. No. 13/293,072, Non-Final Office Action dated Jul. 17, 2015.
U.S. Appl. No. 13/293,072, Non-Final Office Action dated Jul. 19, 2013.
U.S. Appl. No. 13/762,043, Final Office Action dated Jun. 8, 2015.
U.S. Appl. No. 13/762,043, Non-Final Office Action dated Nov. 17, 2014.
U.S. Appl. No. 13/762,043, Notice of Allowance dated Nov. 9, 2015.
U.S. Appl. No. 13/913,323, Final Office Action dated Apr. 21, 2015.
U.S. Appl. No. 13/913,323, Non-Final Office Action dated Mar. 12, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
U.S. Appl. No. 15/025,256, Non-Final Office Action dated Oct. 19, 2017.
U.S. Appl. No. 15/133,175, Non-Final Office Action dated Sep. 21, 2017.
WIPO Application No. PCT/US2015/029105, PCT International Preliminary Report on Patentability dated Nov. 8, 2016.
WIPO Application No. PCT/US2015/029105, PCT International Search Report and Written Opinion of the International Searching Authority dated Jul. 27, 2015.
Abari, et al., "Caraoke: An E-Toll Transponder Network for Smart Cities," Proceedings of the 2015 ACM Conference on Special Interest Group on Data Communication, SIGCOMM '15, pp. 297-310, ACM, (2015). [Retrieved from the Internet Nov. 27, 2017: <http://www.mit.edu/~abari/Papers/Sigcomm15.pdf>].
Aargenox, "A BLE Advertising Primer," 14 pages. [Retrieved from the Internet Nov. 13, 2017: <http://www.argenox.com/bluetooth-low-energy-ble-v4-0-development/library/a-ble-advertising-primer/>].
Bharadia, et al., "BackFi: High Throughput WiFi Backscatter," Proceedings of the 2015 ACM Conference on Special Interest Group on Data Communication, pp. 283-296, ACM, (2015). [Retrieved from the Internet Nov. 27, 2017: <https://web.stanford.edu/~skatti/pubs/sigcomm15-backfi.pdf>].
Bharadia, et al., "FastForward: Fast and Constructive Full Duplex Relays," Proceedings of the 2014 ACM Conference on SIGCOMM, pp. 199-210, ACM, (2014). [Retrieved via the Internet Nov. 28, 2017: <https://web.stanford.edu/~skatti/pubs/sigcomm14-ff.pdf>].
Bharadia, et al., "Full Duplex Mimo Radios," Proceedings of the 11th USENIX Symposium on Networked Systems Design and Implementation (NSDI 14), pp. 359-372, USENIX Association, (2014). [Retrieved from the Internet Nov. 27, 2017: <https://www.usenix.org/system/files/conference/nsdi14/nsdi14-paper-bharadia.pdf>].
Bubuettner, et al., "An Empirical Study of UHF RFID Performance," Proceedings of the 14th ACM International Conference on Mobile Computing and Networking, ACM, 223-234, (2008). [Retrieved from the Internet Nov. 27, 2017: <http://citeseerx.ist.psu.edu/viewdoc/download?doi=10.1.1.163.4811&rep=rep1&type=pdf>].
Choi, et al., "Achieving Single Channel, Full Duplex Wireless Communication," Proceedings of the 16th Annual International Conference on Mobile Computing and Networking, pp. 1-12, ACM, (2010). [Retrieved via the Internet Nov. 27, 2017: <https://sing.stanford.edu/pubs/mobicom10-duplex.pdf>].
Ensworth, et al., "Every Smart Phone is a Backscatter Reader: Modulated Backscatter Compatibility with Bluetooth 4.0 Low Energy (BLE) Devices," 2015 IEEE International Conference on RFID, pp. 78-85, IEEE, (2015).
Ettus Research, "VERT2450 Antenna," 1 page. https://www.ettus.com/product/details/VERT2450. [Retrieved via the Internet Nov. 27, 2017: https://www.ettus.com/product/details/VERT2450].
Gollakota, et al., "The Emergence of RF-Powered Computing," Computer, 47(1):32-39, (2014). [Retrieved via the Internet Nov. 27, 2017: <http://citeseerx.ist.psu.edu/viewdoc/download?doi=10.1.1.472.5564&rep=rep1&type=pdf>].
Gummeson, et al., "Flit: A Bulk Transmission Protocol for RFID-Scale Sensors," Proceedings of the 10th International Conference on Mobile Systems, Applications, and Services, pp. 71-84, ACM, (2012). [Retrieved via the Internet Nov. 27, 2017: <https://web.stanford.edu/~pyzhang/papers/sys010fp-gummeson.pdf>].
Halperin, et al., "Tool Release: Gathering 802.11n Traces with Channel State Information," ACM SIGCOMM Computer Communication Review, 41(1):53, 2011. [Retrieved via the Internet Nov. 27, 2017: <http://www.sigcomm.org/sites/default/files/ccr/papers/2011/January/1925861-1925870.pdf>].
Hassanieh, et al., "Securing RFIDs by Randomizing the Modulation and Channel," Proceedings of the 12th USENIX Symposium on Networked Systems Design and Implementation (NSDI '15), (2015). [Retrieved via the Internet Nov. 27, 2017: <https://www.usenix.org/system/files/conference/nsdi15/nsdi15-paper-hassanieh.pdf>].
Hu, et al., "Braidio: An Integrated Active-Passive Radio for Mobile Devices with Asymmetric Energy Budgets," Proceedings of the 2016 Conference on ACM SIGCOMM 2016 Conference, pp. 384-397, ACM, (2016). [Retrieved via the Internet Nov. 27, 2017: <https://people.cs.umass.edu/~dganesan/papers/Sigcomm16-Braidio.pdf>].
Hu, et al., "Laissez-Faire: Fully Asymmetric Backscatter Communication," Proceedings of the 2015 ACM Conference on Special Interest Group on Data Communication, pp. 255-267, ACM, (2015). [Retrieved via the Internet Nov. 27, 2017: <https://conferences.sigcomm.org/sigcomm/2015/pdf/papers/p255.pdf>].
Hu, et al., "Leveraging Interleaved Signal Edges for Concurrent Backscatter," Proceedings of the 1st ACM Workshop on Hot Topics in Wireless, pp. 13-18, ACM, (2014). [Retrieved via the Internet Nov. 27, 2017: <https://panhu.me/pdf/BST.pdf>].
Iyer, et al., "Inter-Technology Backscatter: Towards Internet Connectivity for Implanted Devices," Proceedings of the 2016 Conference on ACM SIGCOMM 2016 Conference, pp. 356-369, ACM (2016). [Retrieved via the Internet Nov. 27, 2017: <https://homes.cs.washington.edu/~gshyam/Papers/interscatter.pdf>].
Jain, et al., "Practical, Real-Time, Full Duplex Wireless," Proceedings of the 17th Annual International Conference on Mobile Computing and Networking, pp. 301-312, ACM, (2011). [Retrieved via the Internet Nov. 27, 2017: <https://web.stanford.edu/~skatti/pubs/mobicom11-duplex.pdf>].
Jain, et al., "Throughput Fairness Index: An Explanation," Technical Report, Department of CIS, The Ohio State University, 9 pages, (1999). [Retrieved via the Internet Nov. 27, 2017: <http://www.cse.wustl.edu/~jain/atmf/ftp/atm99-0045.pdf>].
Katti, et al., "Embracing Wireless Interference: Analog Network Coding," ACM SIGCOMM Computer Communication Review, 37(4):397-408, ACM, (2007). [Retrieved via the Internet Nov. 27, 2017: <https://homes.cs.washington.edu/~gshyam/Papers/anc.pdf>].
Katti, et al., "XORS in the Air: Practical Wireless Network Coding," IEEE/ACM Transactions on Networking (ToN), 16(3):497-510, (2008). [Retrieved via the Internet Nov. 27, 2017: <http://citeseerx.ist.psu.edu/viewdoc/download?doi=10.1.1.212.6393&rep=rep1&type=pdf>].

(56) References Cited

OTHER PUBLICATIONS

Kellogg, et al., "Bringing Gesture Recognition to All Devices," Proceedings of the 11th USENIX Symposium on Networked Systems Design and Implementation (NSDI '14), pp. 303-316, (2014). [Retrieved via the Internet Nov. 27, 2017: <https://www.usenix.org/system/files/conference/nsdi14/nsdi14-paper-kellogg.pdf>].
Kellogg, et al., "Passive Wi-Fi: Bringing Low Power to Wi-Fi Transmissions," Proceedings of the 13th USENIX Symposium on Networked Systems Design and Implementation (NSDI '16), pp. 151-164, (2016). [Retrieved via the Internet Nov. 27, 2017: <https://www.usenix.org/system/files/conference/nsdi16/nsdi16-paper-kellogg.pdf>].
Kellogg, et al., "Wi-Fi Backscatter: Internet Connectivity for RF-Powered Devices," Proceedings of the 2014 ACM Conference on SIGCOMM, pp. 607-618, ACM, (2014). [Retrieved via the Internet Nov. 27, 2017: <https://homes.cs.washington.edu/~gshyam/Papers/wifibackscatter.pdf>].
Liu, et al., "Ambient Backscatter: Wireless Communications Out of Thin Air," ACM SIGCOMM Computer Communication Review, 43:39-50, (2013). [Retrieved via the Internet Nov. 27, 2017: <http://abc.cs.washington.edu/files/comm153-liu.pdf>].
Liu, et al., "Enabling Instantaneous Feedback with Full-duplex Backscatter," Proceedings of the 20th Annual International Conference on Mobile Computing and Networking, pp. 67-78, ACM, (2014). [Retrieved via the Internet Nov. 27, 2017: <https://homes.cs.washington.edu/~gshyam/Papers/fullduplexbackscatter.pdf>].
Mango Communications, 802.11 Reference Design: PHY, 4 pages. [Retrieved via the Internet Nov. 27, 2017: <https://warpproject.org/trac/wiki/802.11/PHY>].
Ou, et al., "Come and Be Served: Parallel Decoding for COTS RFID Tags," Proceedings of the 21st Annual International Conference on Mobile Computing and Networking, ACM, pp. 500-511, (2015). [Retrieved via the Internet Nov. 27, 2017: <https://www.sigmobile.org/mobicom/2015/papers/p500-ouA.pdf>].
Parks, et al., "Turbocharging Ambient Backscatter Communication," Proceedings of the 2014 ACM Conference on SIGCOMM, pp. 619-630, ACM, (2014). [Retrieved via the Internet Nov. 27, 2017: <https://homes.cs.washington.edu/~gshyam/Papers/turbocharge.pdf>].
Patel, et al., "A review of wearable sensors and systems with application in rehabilitation," Journal of Neuroengineering and Rehabilitation, 9(1):21 (17 pages), (2012). [Retrieved via the Internet Nov. 27, 2017: <https://jneuroengrehab.biomedcentral.com/track/pdf/10.1186/1743-0003-9-21?site-jneuroengrehab.biomedcentral.com>].
Pletcher, "Ultra-Low Power Wake-Up Receivers for Wireless Sensor Networks," Ph.D. Dissertation, University of California Berkeley, 164 pages, (2008). [Retrieved via the Internet Nov. 27, 2017: <https://www2.eecs.berkeley.edu/Pubs/TechRpts/2008/EECS-2008-59.pdf>].
Talla, et al., "Hybrid Analog-Digital Backscatter: A New Approach for Battery-Free Sensing," 2013 IEEE International Conference on RFID, pp. 74-81, (2013).
Talla, et al., "Powering the Next Billion Devices with Wi-Fi," arXiv preprint arXiv:1505.06815, (2015). [Retrieved via the Internet Nov. 27, 2017: <https://arxiv.org/pdf/1505.06815.pdf>].
TI, TI CC2541 radio, 3 pages. [Retrieved via the Internet Nov. 27, 2017: <http://www.ti.com/product/CC2541>].
TI, TI CC2650 radio, 3 pages. [Retrieved via the Internet Nov. 27, 2017: <http://www.ti.com/product/CC2650>].
Wang, et al., "Dude, Where's My Card?: RFID Positioning That Works with Multipath and Non-Line of Sight," ACM SIGCOMM Computer Communication Review, 43:51-62, ACM, (2013). [Retrieved via the Internet Nov. 27, 2017: <http://citeseerx.ist.psu.edu/viewdoc/download?doi=10.1.1.594.4575&rep=rep1&type=pdf>].
Wang, et al., "Efficient and Reliable Low-Power Backscatter Networks," Proceedings of the ACM SIGCOMM 2012 Conference on Applications, Technologies, Architectures, and Protocols for Computer Communication, pp. 61-72, ACM, (2012). [Retrieved via the Internet Nov. 27, 2017: <http://haitham.ece.illinois.edu/Papers/sigcomm12-backscatter.pdf>].
Wang, et al., "Rf-Compass: Robot Object Manipulation Using RFIDs," Proceedings of the 19th Annual International Conference on Mobile Computing & Networking (MobiCom '13), pp. 3-14, ACM, (2013). [Retrieved via the Internet Nov. 27, 2017: <https://dspace.mit.edu/openaccess-disseminate/1721.1/87045>].
Wang, et al., "RF-IDraw: Virtual Touch Screen in the Air Using RF Signals," Proceedings of the 2014 ACM conference on SIGCOMM, pp. 235-246, (2014). [Retrieved via the Internet Nov. 27, 2017: <http://www.sigcomm.org/sites/default/files/ccr/papers/2014/August/2619239-2626330.pdf>].
Yang, et al., "Tagoram: Real-Time Tracking of Mobile RFID Tags to High Precision Using COTS Devices," Proceedings of the 20th Annual International Conference on Mobile Computing and Networking, ACM, 237-248, (2014). [Retrieved via the Internet Nov. 27, 2017: <http://citeseerx.ist.psu.edu/viewdoc/download?doi=10.1.1.431.5456&rep=rep1&type=pdf>].
Zhang, "FreeRider hardware and software source code," 2 pages, 2017. [Retrieved via the Internet Nov. 27, 2017: <https://github.com/pengyuzhang/FreeRider>].
Zhang, et al., "Enabling Backscatter Communication among commodity Wi-Fi Radios," Proceedings of the 2016 ACM SIGCOMM Conference pp. 611-612; Aug. 22, 2016.
Zhang, et al., "BLINK: A High Throughput Link Layer for Backscatter Communication," Proceedings of the 10th International Conference on Mobile Systems, Applications, and Services, pp. 99-112, ACM, (2012). [Retrieved via the Internet Nov. 27, 2017: <http://lass.cs.umass.edu/~gummeson/MobiSys12-BLINK.pdf>].
Zhang, et al., "EkhoNet: High Speed Ultra Low-power Backscatter for Next Generation Sensors," Proceedings of the 20th Annual International Conference on Mobile Computing and Networking, pp. 557-568, ACM, (2014). [Retrieved from the Internet Nov. 28, 2017: <https://people.cs.umass.edu/~dganesan/papers/Mobicom14-EkhoNet.pdf>].
Zhang, et al., "Enabling Bit-by-Bit Backscatter Communication in Severe Energy Harvesting Environments," Proceedings of the 11th USENIX Symposium on Networked Systems Design and Implementation (NSDI '14), Berkeley, CA, (2014). [Retrieved via the Internet Nov. 27, 2017: <https://www.usenix.org/system/files/conference/nsdi14/nsdi14-paper-zhang.pdf>].
Zhang, et al., "Enabling Practical Backscatter Communication for On-body Sensors," Proceedings of the 2016 conference on ACM SIGCOMM 2016 Conference, pp. 370-383, ACM, (2016). [Retrieved via the Internet Nov. 27, 2017: <https://pdfs.semanticscholar.org/be77/7196c9fdf60c667d3e020b77b28223b5cd3b.pdf>].
Zhang, et al., "HitchHike: Practical Backscatter Using Commodity WiFi," SenSys '16, ACM, 13 pages, (2016). [Retrieved via the Internet Nov. 27, 2017: <https://web.stanford.edu/~pyzhang/papers/sensys16_back_comm.pdf>].
Zhang, et al., "QuarkOS: Pushing the operating limits of micro-powered sensors," Proceedings of the 14th USENIX conference on Hot Topics in Operating Systems, p. 7, USENIX Association, (2013). [Retrieved via the Internet Nov. 27, 2017: <https://www.usenix.org/system/files/conference/hotos13/hotos13-final19.pdf>].
PCT International Search Report and Written Opinion of the International Searching Authority for application PCT/US2017/058371 dated Jan. 12, 2018.
U.S. Appl. No. 13/293,072, Applicant Initiated Interview Summary dated Aug. 7, 2018.
U.S. Appl. No. 13/293,072, Final Office Action dated Apr. 5, 2018.
U.S. Appl. No. 13/293,072, Notice of Allowance dated Oct. 17, 2018.
U.S. Appl. No. 14/456,807, Non-Final Office Action dated Sep. 21, 2018.
U.S. Appl. No. 14/456,807, Non-Final Office Action dated Oct. 25, 2017.
U.S. Appl. No. 14/456,807, Notice of Allowance dated Jun. 6, 2018.
U.S. Appl. No. 15/025,256, Notice of Allowance dated May 21, 2018.
U.S. Appl. No. 15/025,256, Notice of Allowance dated Sep. 13, 2018.

(56) References Cited

OTHER PUBLICATIONS

U.S. Appl. No. 15/133,175, Final Office Action dated May 10, 2018.
U.S. Appl. No. 15/676,474, Non-Final Office Action dated May 25, 2018.
U.S. Appl. No. 14/456,807, Notice of Allowance dated Mar. 1, 2019.
U.S. Appl. No. 15/307,721, Non-Final Office Action dated Apr. 29, 2019.
WIPO Application No. PCT/US2017/058371, PCT International Preliminary Report on Patentability dated Apr. 30, 2019.
U.S. Appl. No. 15/133,175, Notice of Allowance dated Nov. 28, 2018.
U.S. Appl. No. 13/293,072, Notice of Allowance dated Dec. 27, 2018.
U.S. Appl. No. 15/025,256, Notice of Allowance dated Jan. 3, 2019.
U.S. Appl. No. 15/676,474, Notice of Allowance dated Jan. 17, 2019.
U.S. Appl. No. 15/307,721, Final Office Action dated Dec. 11, 2019.
U.S. Office Action, dated Dec. 11, 2019.
CA Application No. 3,041,667, Examination Report dated May 5, 2020.
EP Application No. 17863512.4 (now published as EP3532981), Supplementary European Search Report and European Search Opinion dated May 27, 2020.
U.S. Appl. No. 15/307,721, Non-Final Office Action dated Jul. 8, 2020.
U.S. Appl. No. 16/344,983, Final Office Action dated Jan. 11, 2021.
U.S. Appl. No. 16/344,983, Non-Final Office Action dated Aug. 21, 2020.

\* cited by examiner

BACKSCATTER ESTIMATION USING PROGRESSIVE SELF INTERFERENCE CANCELLATION

CROSS-REFERENCES TO RELATED APPLICATIONS

This Application is a 371 National Stage Application of PCT/US2014/065814, filed on Nov. 14, 2014 and entitled "BACKSCATTER ESTIMATION USING PROGRESSIVE SELF INTERFERENCE CANCELLATION", which application claims the benefit of priority to U.S. Provisional Application No. 61/904,428, filed on Nov. 14, 2013 and entitled "BACKSCATTER ESTIMATION USING PROGRESSIVE SELF INTERFERENCE CANCELLATION", the contents of which are incorporated herein by reference in their entirety.

The present application incorporates herein by reference in its entirety the contents of commonly assigned U.S. Application No. 61/864,492, filed Aug. 9, 2013, entitled "Full Duplex Radio."

FIELD OF THE INVENTION

The present invention relates to signal estimation, and more particularly to a system and method for estimating properties of backscatter signals using progressive self-interference cancellation.

BACKGROUND

Detecting and measuring backscatter signals present many challenges. One challenge is that the signal being transmitted leaks over to the radio's receiver and causes a large amount of self-interference, which may completely drown out the backscatter because of the limited dynamic range of commercially available radios. Another challenge is that the different components in the backscatter itself may act as self-interference to each other. For example, if there is a nearby reflector, the corresponding reflection may be stronger compared to reflections from a reflector that is further away. The difference between the two reflections, in some cases could be as much as 50-60 dB. With strong interference from the nearby reflectors, the weak reflections may get swamped out. Therefore, there is a need in the art for techniques to estimate parameters of backscatter signals corresponding to different objects in the environment.

SUMMARY

In one embodiment, a backscatter sensor is disclosed. The backscatter sensor includes, in part, a receiver for receiving a composite signal comprising one or more reflections of a transmitted signal, each reflection being reflected by one of a plurality of objects; and a processor configured to estimate at least a first backscatter component of the composite signal using a progressive interference cancellation technique. The first backscatter component of the composite signal corresponds to a reflection of the transmitted signal from a first object. In one embodiment, the first object is the closest object to the receiver among the plurality of objects.

In one embodiment, the receiver further includes, in part, a plurality of receive antennas, each receive antenna being coupled to a receive chain. Each receive chain receives a modified copy of the composite signal. The backscatter sensor may further include, in part, a transmitter for transmitting the transmitted signal. The processor further receives a sample of the transmitted signal. In one embodiment, the transmitter includes one or more transmitters, each transmitter transmitting a signal.

In one embodiment, the processor is further configured to estimate at least one of an amplitude of the first backscatter component, a phase of the first backscatter component and a time delay between transmission of the transmitted signal and reception of the first backscatter component.

In one embodiment, the processor is further configured to remove the estimated first backscatter component from the composite signal to generate a second signal; and estimate a second backscatter component using the second signal. The second backscatter component may correspond to a reflection of the transmitted signal from a second object.

In one embodiment, the processor is further configured to estimate one or more parameters associated with at least the first backscatter component using a linear optimization technique. In one embodiment, the processor is further configured to estimate the one or more parameters in accordance with the following expression:

$$\text{minimize} \sum_m \sum_n \| h_m[n] - \tilde{h}_m[n] \|^2$$

$$\text{subject to} \quad \tau_k \geq 0, \alpha_k \leq 1,$$

$$\theta_k \in [\frac{-\pi}{2}, \frac{\pi}{2}], v_k \in [-\pi, \pi],$$

$$k = \{1, \ldots, L\}, n = \{-N, \ldots, N\},$$

$$m = \{1, \ldots, M\}$$

where $\tilde{h}$ represents an estimated channel response, M represents number of antennas, L represents number of reflected backscatter components, $\alpha_k$ represents an attenuation undergone by the $k^{th}$ backscatter component, $v_k$ represents a phase rotation seen by the $k^{th}$ backscatter component, $\tau_k$ represents a delay between the $k^{th}$ backscatter component and a corresponding transmitted signal, and $\Theta_k$ represents an angle of arrival of kth backscatter component.

In one embodiment, the processor is further configured to estimate the at least the first backscatter component using a Sequential Convex Programming (SCP) algorithm. In one embodiment, the processor is further configured to generate an initial estimate for the SCP algorithm using a continuous basis pursuit (CBP) algorithm. In one embodiment, the processor is further configured to estimate the at least the first backscatter component using a continuous basis pursuit (CBP) algorithm.

In one embodiment, the receiver is further configured to receive the composite signal during a plurality of consecutive non-overlapping time windows, and the processor is further configured to estimate one or more parameters of the first backscatter component based at least on a first portion of the composite signal received in a first window; and iteratively estimate parameters of a next backscatter component based on a second portion of the composite signal received in a next consecutive window. In one embodiment, the consecutive non-overlapping windows have a variable size.

In one embodiment, the processor is further configured to estimate a Doppler frequency corresponding to each object.

In one embodiment, a method for estimating backscatter signals is disclosed. The method includes, in part, receiving a composite signal comprising one or more reflections of a transmitted signal, each reflection being reflected by one of a plurality of objects; and estimating at least a first backscatter component of the composite signal using a progressive interference cancellation technique, wherein the first backscatter component of the composite signal corresponds to a reflection of the transmitted signal from a first object.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
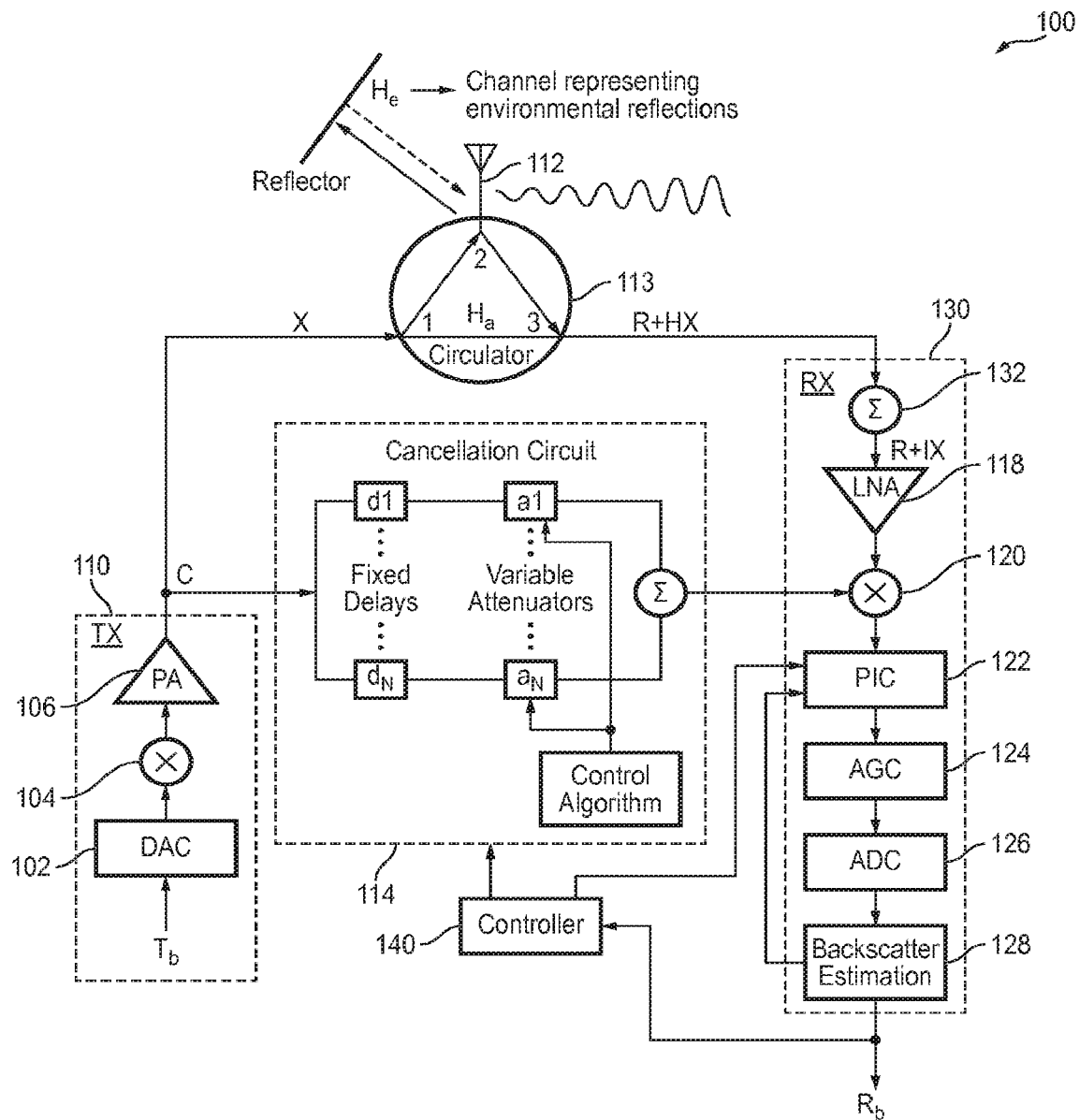
FIG. 1 is a simplified block diagram of a wireless backscatter system, according to an embodiment of the present invention.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments of the present invention provide a system and method for estimating properties of backscatter signals resulted from signal transmissions from one or more transmitters. The properties for each reflected signal may include strength of the reflected signal, the delay experienced by the reflected signal with respect to the transmitted signal, an angle of arrival of the reflected signal, and any other properties.

In one embodiment, such properties may be used by a device to detect specific objects around the device and locate their positions. For example, in one embodiment, the device may estimate dielectric properties of the reflector and infer the nature of the object based on strength of the reflection and the relative delay from the reflector. In another embodiment, the device can estimate location of the reflecting object by using the delay of the signal and angle of arrival of the signal, In general, accuracy of the estimations can be improved by collecting similar information from multiple antennas and combining them with appropriate algorithms.

As used herein, a device may refer to any type of wired and/or wireless device capable of transmitting and/or receiving signals. For example, the device may be a mobile device, a phone (compatible with any wireless standards, such as long term evolution (LTE), $3^{rd}$ generation partnership project (3GPP)), a tablet, a head mount display, a Wi-Fi scanner, a radio frequency transceiver, wireless LAN device, an RF transceiver, and any other type of devices. Moreover, an object may refer to any physical material that can absorb and/or reflect a portion of a signal. For example, an object may refer to walls, furniture, buildings, trees, human body, and any other material other than air, that can reflect at least a portion of a signal.

As described earlier, detecting and measuring backscatter signals may present many challenges, such as self-interference from the transmissions of a signal itself, and/or self-interference caused by reflections from objects that are closer to the transceiver that may drown out the backscatter signals reflected from other objects that are further away. To be able to detect all the different components in the backscatter accurately, the self-interference signal should be removed from the received signal and each of the individual reflections need to be measured.

Certain embodiments disclose techniques for estimating parameters of each reflection (e.g., amplitude, delay, angle of arrival, and the like) from a signal that contains a larger number of reflections combined together into one composite signal. In general, some or all of the reflections may be closely-spaced and well within the sampling interval of the receiver. For example, there may be two reflections that are spaced 1 ns apart (or ½ foot apart in distance). With a radio with a typical sampling rate of 40 Msps, digital samples are taken every 25 ns. In other words, the time resolution requires much smaller values than even what the sampling itself can provide. One option could be to increase the sampling rate, for example to have 1 ns resolution, which means using an ADC with a sampling rate of 1 GHz. However, such high-rate ADCs are prohibitively expensive both in terms of cost as well as power consumption and are infeasible for most radios.

Techniques presented herein may be used in a full-duplex transceiver coupled to one or more antennas, a half-duplex transceiver, a backscatter sensor, or any other type of system capable of measuring and/or processing backscatter signals.

FIG. 1 is a simplified block diagram of a full-duplex wireless backscatter estimation system 100, according to an embodiment of the present invention. Wireless backscatter estimation system 100 may be a commodity multiple-access transceiver system capable of supporting communication with multiple users by sharing the available system resources. Examples of such wireless systems include code division multiple access (CDMA) systems, time division multiple access (TDMA) systems, long term evolution (LTE) systems, orthogonal frequency division multiple access (OFDM) systems or the like. The wireless backscatter estimation system may transmit wireless signals. The transmitted signals will be reflected by objects that are located around the wireless system and many of the reflections arrive back at the wireless system.

Wireless backscatter estimation system 100 includes, in part, a digital-to-analog converter (DAC) 102, a frequency up-converter 104, and a power amplifier (PA) 106 disposed in a transmit path 110. Transmit path 110 may include one or more be coupled to one or more antennas 112 (only one is shown in the figure). The one or more antennas may be configured as a multiple input multiple output (MIMO) antenna array. In one embodiment, antenna 112 is coupled to the transmit chain through a circulator 113. A first port of the circulator receives the transmit signal X from the power amplifier PA 106, a second port of the circulator is coupled to the antenna 112 and a third port of the circulator is coupled to a receive path 130.

Receive path 130 may include a low noise amplifier LNA 118, a frequency down-converter 120, a progressive self-interference cancellation (PIC) block 122, an automatic gain control circuitry (AGC) 124, an analog-to-digital converter (ADC) 126, and a backscatter estimator 128 for estimating parameters of an associated object. In an embodiment, the backscatter estimator may pass the estimated parameters to the progressive self-interference cancellation block 122 to progressively cancel components in the backscatter channel. The progressive self-interference cancellation algorithms will be described in detail below. A controller 140 may be coupled to the RF cancellation circuit 114 and/or PIC 122, and any other component in the circuit.

A portion of transmit signal X, i.e., a self-interference signal HX, leaks into the receive signal that is received by the receive path 130. Accordingly, system 100 also includes a cancellation circuit 114 disposed before the LNA and configured to cancel the self-interference. In an embodiment, the cancellation circuit 114 may be coupled to the transmit path through a coupler to receive a portion of the transmit signal and generate a copy C of the self-interference signal that is then added through an adder 132 to the received signal to cancel or at least reduce the self-interference signal. The cancellation circuit is described in detail in U.S. Application No. 61/864,492, which is incorporated herein by reference in its entirety.

Backscatter Sensor's Operation

Figure 2:
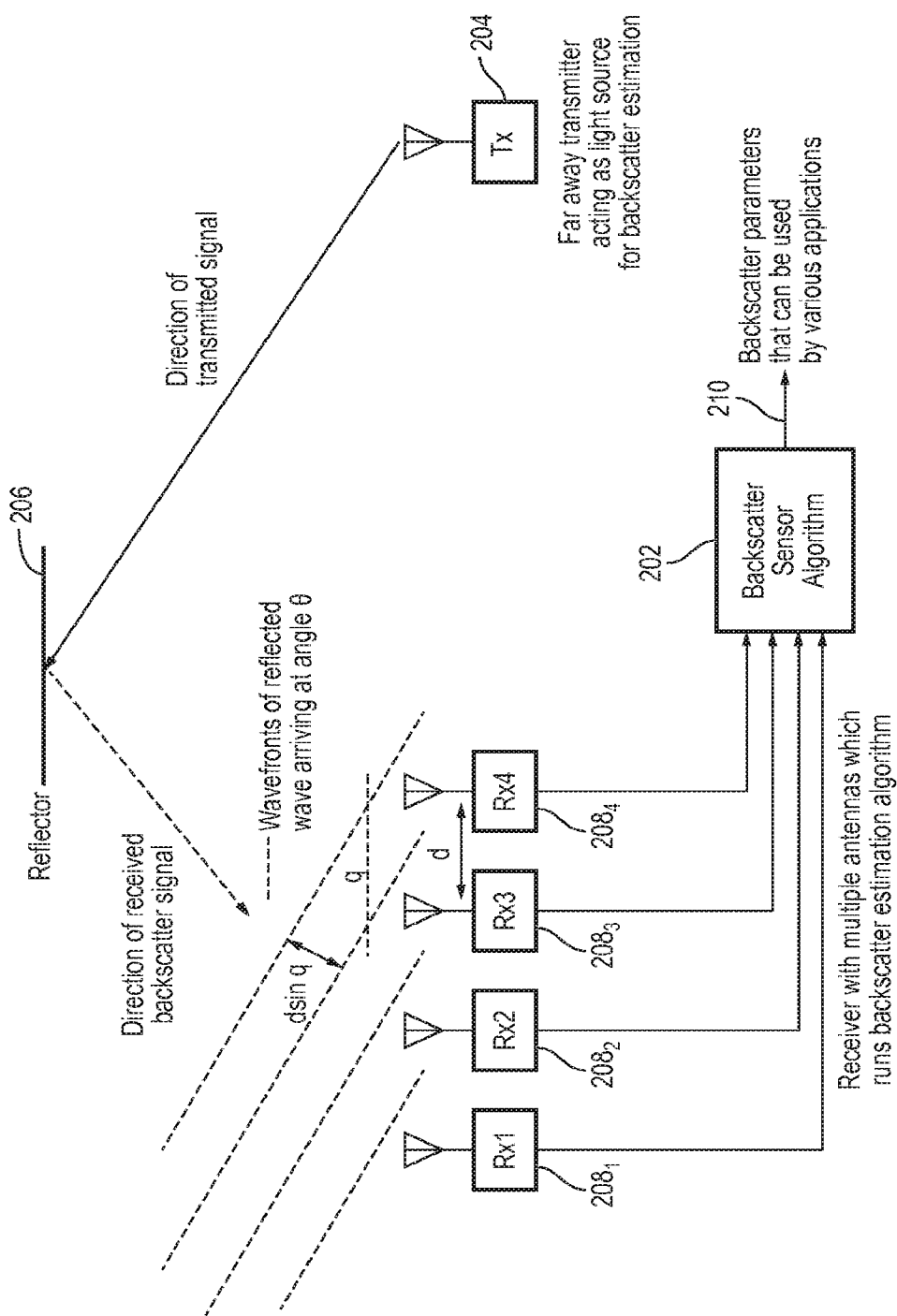
FIG. 2 illustrates an exemplary backscatter sensor, according to an embodiment of the present invention.

FIG. 2 illustrates an exemplary backscatter sensor 202, according to one embodiment. As illustrated, the backscatter sensor 202 uses a wireless transmitter 204 as a light source. The wireless signal is reflected from different reflectors in the environment and arrives at one or more receivers (e.g., receivers $208_1$ through $208_4$) at different angles of arrival. It should be noted that although four receivers are shown in this example, the backscatter sensor may include any number of antennas, without departing from the teachings of the present disclosure.

The received signal is sampled by the receivers (e.g., Rx1 through Rx4) and the digital samples are passed to the backscatter sensor 202. The backscatter sensor estimates parameters of each backscatter signal impinging on the antennas. The backscatter sensor is described in more detail in the rest of this document.

Figure 3:
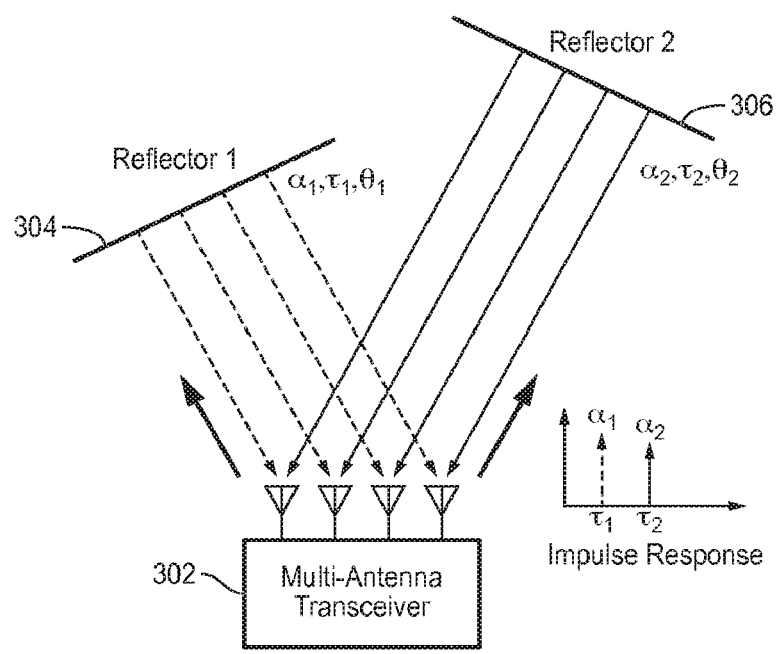
FIG. 3 is a simplified multi-antenna system receiving two backscatter reflections, according to an embodiment of the present invention.

FIG. 3 is a simplified multi-antenna transceiver 302 receiving two backscatter reflections at different delays, angles of arrival, and amplitudes, according to an embodiment of the present invention. As shown, the multi-antenna transceiver receives a strong reflection from a first reflector 304, and a weak reflection from a second reflector 306. The reflections are received with amplitudes $\alpha_1$ and $\alpha_2$, and delays $\tau_1$ and $\tau_2$, respectively. In other words, if a signal x(t) is transmitted, the backscatter signal is given by $\alpha_1 x(t-\tau_1) + \alpha_2 x(t-\tau_2)$. The example shown in FIG. 3 is a simple delayed and attenuated reflection whose impulse response is given by $\alpha_1 \delta(t-\tau_1) + \alpha_2 \delta(t-\tau_2)$. Note that in practice, reflections get more attenuated as delay increases because the signal with larger delay has traveled a longer distance.

Single Receiver Signal Model

In one embodiment, a simplified model of the backscatter estimation system can be written as follows. The wireless transceiver is transmitting a signal x(t). There are L backscatter reflections of the transmitted signal arriving back at the transceiver. The parameters of the backscatter reflections may be written as follows:

$(\alpha_1, \nu_1, \tau_1, \Theta_1), \ldots, (\alpha_L, \nu_L, \tau_L, \Theta_L)$ where $\alpha_k$ represents an attenuation undergone by the $k^{th}$ backscatter component, $\nu_k$ represents a phase rotation seen by the signal, $\tau_k$ represents a delay between the backscatter signal and the original signal, and $\Theta_k$ represents an angle of arrival. For ease of explanation, first a mathematical model of a simplified system with only one receiving antenna and without the use of AoA parameter is described.

The composite signal that arrives at the receiving antenna can be written as follows:

$$y(t) = \sum_{k=1}^{L} \alpha_k e^{i\nu_k} x(t-\tau_k), \quad (1)$$

where i represents an imaginary number.

In one embodiment, receive chain of the radio is tuned to the same carrier frequency as the transmitter. The receiver may have a bandwidth that corresponds to the sampling rate of the ADC. For example, a 40 Msps ADC would imply trying to receive a 40 MHz signal. The radio RX chain down-converts the received signal to analog baseband, applies a low-pass filter of bandwidth B, and then digitizes the signal. In one example, the bandwidth B corresponds to half of sampling rate of the ADC. In general, the process of filtering to a particular bandwidth B can be modeled as convolution with a filter of bandwidth B.

Since, a time domain response of a rectangular filter of bandwidth B is a sinc pulse, the overall signal received at baseband $y_B(t)$ may be written as follows:

$$y_B(t) = \left( \sum_{k=1}^{L} \alpha_k e^{i\nu_k} x(t-\tau_k) \right) \otimes sinc(B(t)). \quad (2)$$

This baseband analog signal is sampled by the ADC to produce the following discrete time signal:

$$y_B[n] = \left( \sum_{k=1}^{L} \alpha_k e^{i\nu_k} x(nT_s - \tau_k) \right) \otimes sinc(B(nT_s)), \quad (3)$$

where $T_S$ is the sampling interval.

This equation can be rearranged as follows:

$$y_B[n] = \left( \sum_{k=1}^{L} \alpha_k e^{i\nu_k} sinc(B(nT_s - \tau_k)) \right) \otimes x[n], \quad (4)$$
$$= h[n] \otimes x[n]$$

where the term $$h[n] \triangleq \sum_{k=1}^{L} \alpha_k e^{iv_k} sinc(B(nT_s - \tau_k))$$

is the backscatter channel through which the transmitted signal passes through before reaching the receiver. In general, the backscatter channel includes contribution from the environmental channel. The filters at the transmit and/or receive chains can be viewed as a channel with impulse response sinc(B(t)). The environmental channel can be viewed as sum of impulses. Hence, the total channel through which the transmitted signal passes may be written as sum of weighted and shifted sinc signals, as illustrated in FIG. 4B. In the above equation, the transmitted signal x[n] and the received signal $y_B[n]$ are known. Therefore, the overall channel response h[n] can be calculated using known de-convolution techniques.

Figure 4C:
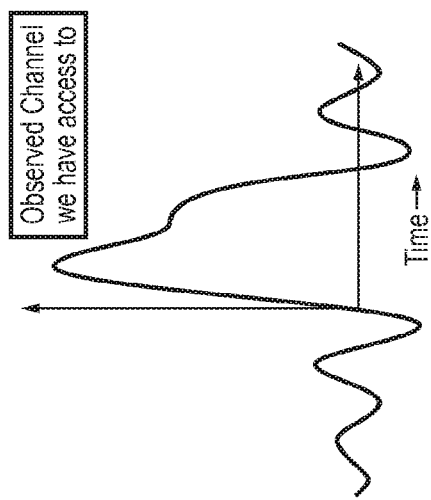
FIGS. 4A through 4C illustrate exemplary backscatter channels, according to one embodiment.
Figure 4B:
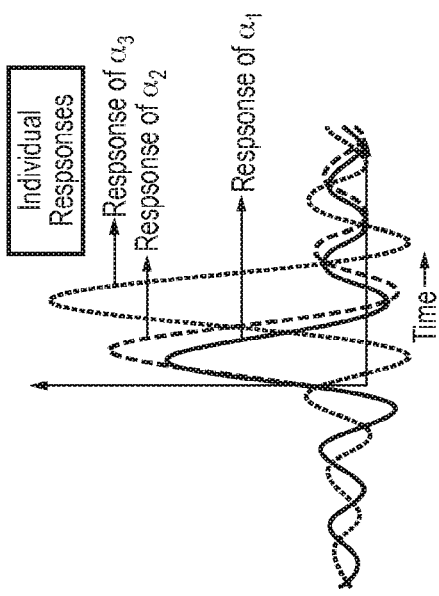
Figure 4A:
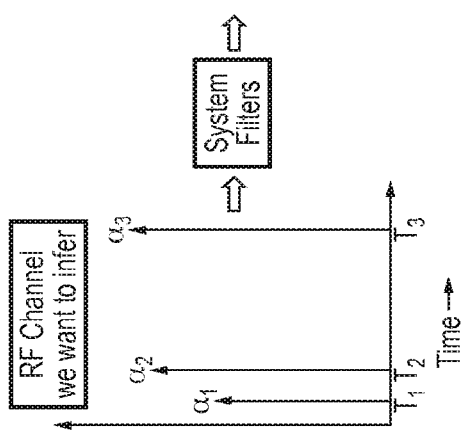

FIGS. 4A through 4C illustrate a backscatter channel, according to one embodiment. FIG. 4A illustrates an exemplary RF backscatter channel composed of three impulses with amplitudes $\alpha_1$, $\alpha_2$, and $\alpha_3$, and delays $\tau_1$, $\tau_2$, and $\tau_3$, respectively. As illustrated, the original reflections from the environment are closely located impulses. After going through the band-limited receiver, the impulses are converted to sinc functions, and the overall response is a combination of all the sinc functions. FIG. 4B illustrates channel responses corresponding to each of the individual impulses shown in FIG. 4A. FIG. 4C illustrates the combined backscatter channel response that is observed. The overall responses looks similar to the sinc function corresponding to the strongest reflection. This is why two closely-spaced reflections are difficult to disentangle. Although $\alpha_k$ and $\tau_k$ for k=1, 2, 3 need to be estimated, only the combined channel response (shown in FIG. 4C is known).

It should be noted that the combined channel response is similar to the scenario where there is only a single reflection at τ1. This is because the second reflection at τ2 is closely spaced in time and is also very weak compared to the first reflection, hence, the second reflection does not contribute significantly to the overall response. In one embodiment, techniques are disclosed for accurately estimating individual responses at τ1, τ2 and τ3 from the combined response in scenarios where they are separated in time by interval smaller than the sampling interval (sub-sampling).

It should be noted that reflection coefficients exhibit a heavy tailed distribution as shown in FIG. 4B. The strongest backscatter component is the signal that is directly leaking through from the transmit chain to the receive chain, the next strongest backscatter component is the closest first reflection, and so on. Furthermore, the first few leaked strongest components can be nearly 70-80 dB stronger than the other weak multi-path components. A typical Wi-Fi receiver has a dynamic range of 60 dB. The dynamic range may specify the highest ratio between the strongest and the weakest signals that can be received without significant distortion of the weakest signal. Consequently, the strong backscatter components can quite easily drown out the weaker backscatter components. In summary, in one embodiment, the present invention determines all the attenuations α, delays τ, angle of arrivals (AoA) θ of one or more of the individual backscatter components accurately from the sampled, band-limited backscatter signal despite the limited dynamic range and finite bandwidth of a transceiver.

Multiple Receiver Signal Model

In one embodiment, multiple receiving antennas may be present in the system. In this scenario, each component of the backscatter signal undergoes additional phase shift which is a function of the angle of arrival (AoA) of the signal at each antenna. This additional phase shift arises due to the fact that the signal has to travel additional distance due to the relative position of the antennas in an antenna array (e.g., a Uniform Linear Array (ULA)). In general, receive antennas may be spaced uniformly, or with varying distances, without departing from the teachings of the present disclosure. In one example, the composite backscatter channel as seen by the $m^{th}$ receiver in the ULA can be modeled as follows:

$$h_m[n] = \sum_k \alpha_k e^{i(v_k + \gamma_{mk})} sinc\left(B\left(nT_s - \left(\tau_k + \frac{\gamma_{mk}}{2\pi f_c}\right)\right)\right), \quad (5)$$

where $$\gamma_{mk} = \frac{2\pi}{\lambda}(m-1)d sin\Theta_k$$

is the added phase shift experienced by the $k^{th}$ reflection at the $m^{th}$ receiver relative to the first receiver, when the reflected signal arrives back at $\Theta_k$ AoA; $\alpha_k e^{iv_k}$ is the complex attenuation for the $k^{th}$ reflection; and $\tau_k$ is its corresponding delay. The constant $f_c$ is the carrier frequency with wavelength of λ, and d is the distance between the successive receiving antennas in the array. Theoretically, $h_m[n]$ can be of infinite length, but in practice, the sinc function decays to very small values for large values of n. Thus, the channel can be modeled by a finite length vector with n taking a value in the range of [−N,N]. Similar to the single antenna case, the composite finite-length linear channel $h_m[n]$ can be estimated by de-convolving the received signal with known transmitted signal.

In one embodiment, one or more Doppler frequencies corresponding to each of the reflecting objects are estimated. In one embodiment, an additional multiplicative term may be added to Eqn (5) to estimate Doppler frequencies corresponding to each reflector. This additional term may be carried over in the subsequent estimation stages as an additional variable, and be solved alongside the other variables that are currently described. For example, for estimating Doppler frequency the additional multiplicative term $$e^{i2\pi f_{d_k} t}$$

may be added to Eqn. (5), where $f_{d_k}$ is the unknown Doppler frequency due to the $k^{th}$ reflector at time instance 't'. For ease of computation, the additional phase shift introduced by the Doppler Shift can be incorporated into the phase term $\gamma_k$. In this case, the Doppler frequency can be estimated as the slope of phase vs the time instance 't' by fitting the estimated phase at different time instances 't' against the time instances. Another method is to introduce a new variable $f_{d_k}$ for the Doppler frequency. Then all the subsequent optimization formulations, as described above, utilize the updated form of Eqn. (5) and solve for $f_{d_k}$ along with other variables at several estimation time instances 't'. In this method, the phase is first estimated once without the variable $f_{d_k}$, then in the subsequent estimation time instances, the values of the phase $\gamma_k$ estimated in the earlier time instance is substituted in the modified Eqn (5) and $f_{d_k}$ term is estimated by adding it as a variable. Once the Doppler frequency is estimated, the corresponding velocity of the reflector can be inferred using standard physical relationship: $v_k = f_{d_k} C/f_c$, where $f_c$ is the center frequency or the carrier frequency, and C is the speed of the radio wave in air.

Enhanced Temporal and Spatial Resolution Algorithm

As noted earlier, wireless signal propagation in a typical indoor environment can easily lead to backscatter reflections that are closer than the sampling interval of the receiving radios. In general, such closely-spaced reflections lead to a degenerate system of equations. For example, when the reflections at two delays $\tau_1$ and $\tau_2$ are closely spaced, the difference in sample values of the corresponding sinc functions are very small and therefore the observations are highly correlated. As more reflections are closely spaced within a sampling period, the problem of uniquely reconstituting the reflections becomes more difficult. Consequently, reconstruction error increases since the optimization algorithm struggles to find a good fit.

On embodiment discloses a technique to accurately deconstruct signals from two very closely-spaced reflectors in time (i.e., the relative delays from the transmitter to the two reflectors are within a sampling period of each other). The disclosed technique utilizes the fact that the backscatter signals reflected from the two reflectors have different angle of arrivals at different antennas. Therefore, spatial orientation of the reflectors relative to the transmitter is different.

In one example, a transceiver has four antennas to receive different copies of the reflected signal. A first reflection and a second reflection are closely spaced in time, which are received with angles $\Theta_1$ and $\Theta_2$, respectively. These reflections can be distinguished in the spatial dimension because they exhibit different phases at different antennas. It should be noted the two reflections will travel different distances which translates to phase differences across successive antennas. In one embodiment, this constraint is incorporated into the optimization problem to disentangle closely spaced reflections within a single sampling period.

In one example architecture, with 4 antennas (expected to be found in the next generation Wi-Fi radios), up to 4 closely-spaced reflections can be distinguished within a single sampling period. This technique enables the system to get the same performance as an ADC that has four times the sampling bandwidth of the system while still using relatively inexpensive commodity radios.

Estimation Algorithm

One embodiment utilizes an estimation algorithm to estimate parameters of different backscatter signals. Once the composite linear channel is estimated, parameters of the constituent backscatter components can be estimated by solving the following optimization problem:

$$\text{minimize} \quad \sum_m \sum_n \| h_m[n] - \tilde{h}_m[n] \|^2 \quad (6)$$

$$\text{subject to} \quad \tau_k \geq 0, \alpha_k \leq 1,$$

$$\theta_k \in \left[\frac{-\pi}{2}, \frac{\pi}{2}\right], v_k \in [-\pi, \pi],$$

$$k = \{1, \ldots, L\}, n = \{-N, \ldots, N\},$$

$$m = \{1, \ldots, M\}$$

where $\tilde{h}$ is the estimated linear channel response obtained by the deconvolution of received samples with a known signal, M is the number of antennas in the array, and L is the total number of reflected backscatter components.

This optimization problem is non-convex and is not known to have a global solution. Instead, in one embodiment, the optimization problem in Eqn. (6) is solved approximately by finding a locally optimal solution. For example, in one embodiment, a heuristic known as Sequential Convex Programming (SCP) may be used, in which all the non-convex functions are replaced by their convex approximation. It should be noted that any other method may be used to solve the above optimization problem without departing from the teachings of the present disclosure.

Next, the resulting convex problem is solved in a restricted domain of variables known as trust region to obtain a local solution. This local solution can be improved upon by testing the goodness of the approximated function to the original function and updating the trust region based on the result of this test. This process can be repeated in an iterative manner until a reasonable solution is achieved.

In one embodiment, Eqn. (5) is approximated by a linear function around previous solution of the convex problem in order to convert Eqn. (6) into a convex problem. It should be noted that any other method may be used to approximate Eqn. (5) and/or convert Eqn. (6) into a convex problem without departing from the teachings of the present disclosure.

Initialization of Estimation Algorithm

As mentioned before, Eqn. (6) can be solved locally by linearizing Eqn. (5) around a point in variable domain ($\alpha$, $\tau$, $\Theta$, $v$). Therefore, the Sequential Convex Programming (SCP) formulation needs a starting point to begin its iteration. The final solution given by SCP is very dependent on the goodness of this initial estimate. One way to get a good initialization point is to try several random starting points and choose the one that results in the smallest value for the objective function of the optimization problem in Eqn. (6). However, by understanding the nature of the backscatter parameters, a better initialization point may be used, according to one embodiment.

In a typical indoor environment, there may only exist a limited number of reflectors. Therefore, only a limited number of backscatter signal (e.g., less than five) may be present. Moreover, if energy of a backscatter signal is outside of the dynamic range of the ADC, such reflections may not be visible to the receiver. This further reduces the number of backscatter signals that can be simultaneously observed by a backscatter sensor. Therefore, the solution to the optimization problem in Eqn. (6) is sparse in the variable domain ($\alpha$, $\tau$, $\Theta$, $v$).

In one embodiment, this sparsity is exploited to find a good starting point for the SCP formulation of Eqn. (6). As an example, continuous basis pursuit (CBP) algorithm may be used to find the starting point. The CBP is a technique known in the art for finding sparse solutions. In general, any basis pursuit techniques (e.g., CBP, LASSO, and the like) may be used to generate a starting point for the SCP formulation without departing from the teachings of the present disclosure. In one embodiment, the optimization problem is formulated as a LASSO problem, as follows:

$$\beta_m = \underset{\beta_m}{\operatorname{argmin}} \| D\beta_m - \tilde{h}_m \|^2 + \lambda_r | \beta_m |_1, m = 1 \ldots M, \quad (7)$$

where $\beta_m$, m=1 . . . M are complex optimization variables.

A dictionary matrix D can be built as follows. From Eqn. (5), it is clear that the backscatter channel is sum of scaled and shifted version of the function $f_\tau(n)=\text{sinc}(B(nT_s-\tau))$. In general, each of the scaling factors can be a complex number. Each column of D consists of samples of function $f_\tau(n)$ for a fixed set of delays $\hat{\tau}_1 \ldots \hat{\tau}_p$. In one embodiment, the minimum delay $\hat{\tau}_1$ and the maximum delay $\hat{\tau}_p$ are chosen empirically based on the expected arrival time of the earliest and the latest reflections, respectively. Next, the range of delay $[\hat{\tau}_1, \hat{\tau}_p]$ is uniformly gridded with grid interval Ni. The grid interval may be selected such that it represents interval of the reflection arrival time that is expected to be resolved. However, the grid intervals may be selected using any technique without departing from the teachings of the present disclosure. Note that this formulation leads to a convex problem and can be solved accurately using any of the known methods, such as interior point method for convex problems.

In one embodiment, the first term in the objective equation (7) is an error between the computed channel $\tilde{h}_m$ and the scaled sum of $f_\tau(n)$, where $\beta_m$ has P components corresponding to the grid points $\hat{\tau}_k$. The second term in the objective equation, $|\beta_m|_1$, enforces sparsifying effect in the solution $\beta_m$ by forcing many of the terms in the solution to be equal to zero. Here, $\lambda_r$ represents a regularization coefficient chosen to be a positive number and can be chosen to tradeoff between the sparsity of solution $\beta$, and minimization of the error $$\sum_m \left( \|D\beta_m - \tilde{h}_m\|^2 \right).$$

This tradeoff can be appropriately selected by analyzing the signal-to-noise ratio (SNR) of the signals. Once the solution $\beta_m$ is obtained, the backscatter parameter of interest can be extracted as follows:

$$\alpha_k = \sum_k |\beta_{mk}|/M, \; v_k = \angle\beta_{1k}, \; \gamma_{mk} = \angle\beta_{mk} - v_k, \; \tau_k = \hat{\tau}_k - \frac{\gamma_{mk}}{2\pi f_c}.$$

In the above method of solving problem in Eqn. (7), an implicit assumption was made that the true delay $\tau_k$ falls on one of the grid points $\hat{\tau}_1 \ldots \hat{\tau}_p$ of the dictionary D. However, this may not be true in all scenarios. Therefore, in one embodiment, the problem can be modified to add interpolation functions so that the solution to the LASSO problem is not constrained to fall on the chosen grid points $\hat{\tau}_1 \ldots \hat{\tau}_p$.

In one embodiment, a known technique in the art can be used to add circular interpolation functions to the LASSO problem. The solution to Eqn. (7) finds backscatter parameters for P reflections, many of which may have zero energy (due to the added constraint on the sparsity). In one embodiment, L backscatter parameters with the largest energy can be chosen out of these P reflection parameters as an initial starting point for the SCP formulation.

Dynamic Range Boosting Algorithm

Figure 5:
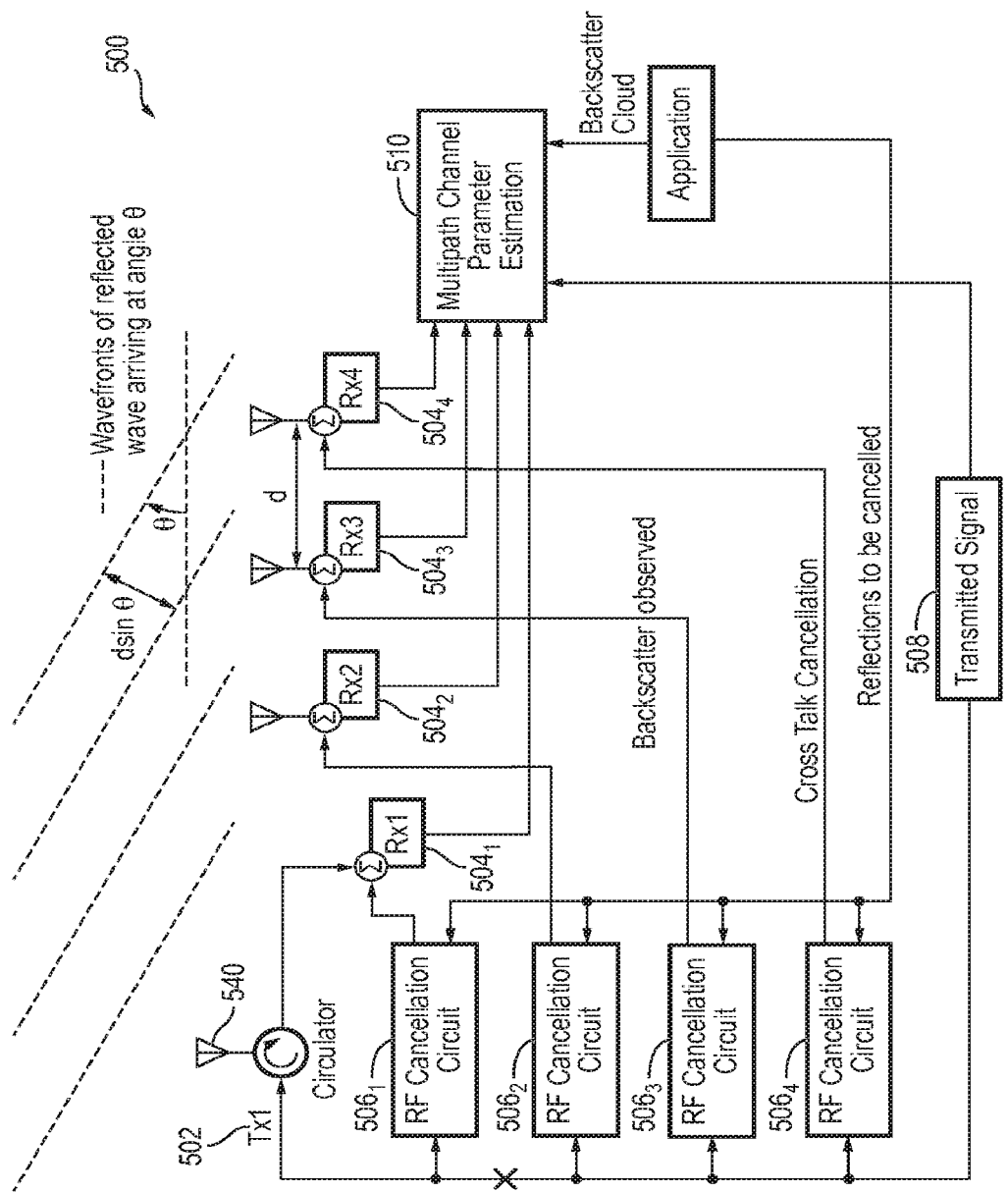
FIG. 5 illustrates an exemplary block diagram of a backscatter sensor with range boosting, according to one embodiment of the present invention.

FIG. 5 illustrates an exemplary block diagram of a backscatter sensor with range boosting, according to one embodiment. The backscatter sensor includes a modified wireless radio that has one transmitting antenna, and up to four receiving antennas arranged in a linear configuration with fixed distance between them. Such an antenna array configuration are commonly called Uniform Linear Array (ULA). It should be noted that this configuration is a mere example, and any number of transmit and/or receive antennas with similar or different antenna spacing may be used without departing from the teachings of the present disclosure.

As shown in FIG. 5, the transmitting antenna 502 is also acting as one of the receiving antennas in the ULA. It should be noted that number of antennas in a wireless device is usually limited by the form factor of the device. For example, length of a Wi-Fi antenna can be in the range of 12.5 cm. Therefore, sharing of antennas between transmit and receive functions is useful to pack as many antennas in a small form factor. However, such a sharing results in additional complexity for backscatter sensor's operation which will be addressed in the following sections. It should be noted that although in FIG. 5 antenna 540 is shown to be used to both transmit and receive signals, in general, each antenna may be used in half-duplex or in full-duplex without departing from the teachings of the present disclosure.

Typical wireless receivers have dynamic range of 60 dB. Ideally, the entire dynamic range is to be dedicated for capturing the backscatter reflections of the environment in which backscatter sensor is present. However, there are many spurious signals that prevent us from achieving this goal.

In general, increasing the number of receiving antennas in the backscatter sensor results in increased spatial resolution. In fact, wireless communications also benefits from larger number of receiving antennas. But, wireless antennas are typically of the order of 12.5 cm in length for 2.4 GHz operation. This large form factor limits the number of antennas that can exist in a wireless device. In order to save space occupied by the antennas and to save the cost of antenna itself, wireless devices use the same antenna for dual purpose of transmission and reception of signal. Almost all the existing wireless radios are half-duplex in nature, where they are either transmitting a signal or they are receiving a signal but not both at the same time. Therefore, they can multiplex the use of a single antenna for either transmission or reception.

It should be noted that the backscatter sensor should perform both transmission and reception of the signal simultaneously, or almost simultaneously. The primary reason for this is that typical wireless signals have limited bandwidth which puts a limit on how sharp the transmitted signal can be. In a typical indoor environment, the reflections from nearby objects arrive back at the receiver much earlier than the interval that is needed to transmit the sharpest signal that is allowed by the limited bandwidth of the radio. Typically, the reflected signals are 100 billion times smaller than the transmitted signals, therefore, for proper operation of the backscatter sensor, we need ability to transmit a strong signal and simultaneously listen to the weak reflections of the transmitted signal using the same antenna or a different antenna. This requirement is very similar to the one that is faced by full-duplex radios, that transmit and receive simultaneously using the same antenna.

In this disclosure, techniques that are described in the U.S. patent application No. 61/864,492 for full-duplex communication are used to boost the dynamic range of the backscatter sensor. In a full-duplex radio, as shown in FIG. 1, both the transmitter and the receiver chains are connected to the same antenna via a circulator. Circulator is an RF device that tries to achieve unidirectional signal paths from port #1-to-port #2 and from port #2-to-port #3 as shown by the two arrows in FIG. 1. However, parasitic path exists between port #1-to-port #3, which causes leakage of strong transmitted signal into the receive chain. The leakage can saturate the receiver's ADC.

Additionally, some portion of the RF energy that is directed to the antenna from the transmitter, reflects back from the antenna instead of radiating into the air due to the antenna imperfections. This RF energy also leaks into the receiver from port #2-to-port #3 along with the received backscatter signal. Both of these spurious mechanisms of transmit signal's leakage into the receiver is detrimental for operation of both the full-duplex radios and the backscatter sensor. However, the radiated RF energy from the antenna is also reflected back to the receiver by reflectors in the nearby environment. This reflection is detrimental for operation of the full-duplex radio, because the full duplex radio is trying to receive a different signal, rather than listening to its own echo. However, backscatter sensor relies on these reflections from the environment to extract interesting parameters regarding the reflectors.

Therefore, a full-duplex radio is designed to cancel all the traces of transmitted RF signal that arrives at the receiver chain. Whereas, in a backscatter sensor, portion of the transmitted signal leaking via parasitic paths in the circulator and via reflection due to antenna imperfection should to be canceled, while allowing the reflections from the environment to pass uninterrupted to the receiver. This difference in transmit signal cancellation engenders modification to the techniques that are developed for the full-duplex communication.

Additionally, applications that use backscatter sensor may selectively want to cancel certain reflections. For example, a motion tracing application built using the backscatter sensor may want to cancel backscatter reflections coming from static objects, such as walls and furniture's, which can easily be an order of magnitude stronger than the intended reflection from moving objects, such as human body. Such a selective cancellation in RF domain can have additional advantage of improving the accuracy of the intended reflections. Because the useful dynamic range of the ADC can now represent the intended reflections from moving objects with larger number of significant bits compared to when the strong unwanted reflections are present. They will also enable the backscatter sensor to sense weaker reflections once the stronger reflections are removed despite limited dynamic range of the wireless receivers.

In one embodiment, a cancellation technique that is used by a backscatter sensor is disclosed. In an example full-duplex architecture, cancellation of the transmitted signal is done in RF domain by taking a copy of the transmitted signal and passing it through a tapped delay line RF filter, with fixed delay lines and variable attenuators. The filter response is dynamically adapted to match the composite channel that the transmitted signal has passed through before reaching the input of the receiver chain. This composite channel is collectively represented in frequency domain by H in FIG. 1. As mentioned before, this channel has two major components $H=H_a+H_e$. The first part, $H_a$, is the portion that includes the parasitic path via the circulator and the reflection path coming from the antenna imperfection. And the second part, $H_e$, is the portion that includes the contributions from all the reflectors in the environment.

Channel $H_a$ is fixed, since it corresponds to the response of passive components of the radios (e.g., circulator and antenna, and the like). Channel $H_a$ can be measured using vector network analyzer (VNA). Channel $H_e$ is time varying, since it corresponds to changing reflections in the environment. In fact, in one embodiment, channel $H_e$ is obtained by taking Fourier transform of the backscatter channel response described in Eqn. (5). Additionally, in one embodiment, if value of the backscatter parameters corresponding to a certain reflector in the environment is known, one can simply compute the corresponding frequency domain contribution of the reflector in the channel $H_e$ by using Eqn. (5). This will come handy for applications that require cancellations of specific reflections, and is one of the main differences between requirements of a full-duplex radio and the backscatter sensor. From now on, $H_c$ is used to denote a portion of the environmental channel $H_e$ that a specific application wishes to cancel.

In one embodiment, an RF cancellation circuit may include multiple delay lines with variable attenuators for canceling the effect of transmitted signal in the receiver input in a full-duplex radio. The delay lines have fixed values and the attenuators have finite discrete values that can be selected electronically. The number of delay lines, their delay values, and the tuning range of these attenuators needs to be carefully designed in order for this filter to work in all environmental conditions. Details of designing RF cancellation circuit is disclosed in the U.S. patent application No. 61/864,492 for designing these RF filters. The RF filter is tuned adaptively by a control algorithm by selecting appropriate attenuation values based on the cancellation requirements.

In one embodiment, a first step in building the tuning algorithm is to create a dictionary frequency response matrix $F_i$ whose columns represent the pre-measured frequency response of the $i^{th}$ delay line and attenuator for a specific attenuation value. Such a dictionary matrix is built for each of the delay line and attenuator combinations of the RF cancellation filter. It should be noted that the practical attenuators will have finite discrete value of attenuation. In addition, for each values of the attenuation, the filter also has a unique phase shift and group delay. Thus, the number of columns in the dictionary $F_i$ equals the total number of unique values of attenuation in the $i^{th}$ attenuator. Next, the following optimization problem is solved to obtain optimal values for all the attenuators in the RF cancellation filter:

$$\underset{\zeta_i, i=1,\ldots,\Gamma}{\text{minimize}} \quad \|\sum_i F_i \zeta_i - (H_a + H_c)\|^2 \qquad (8)$$

$$\text{subject to} \quad \zeta_{ij} \in [1, 0],$$

$$\sum_j \zeta_{ij} = 1, i = 1, \ldots, \Gamma, j = 1, \ldots, \Lambda,$$

where the variable $\zeta_{ij}$ is a binary variable that indicates the $j^{th}$ attenuator setting for the $i^{th}$ attenuator of the RF cancellation filter, $\Gamma$ is the total number of delay lines in the filter, and $\Lambda$ is the total number of attenuator values in each attenuators. This is a combinatorial optimization problem and is usually hard to solve. Therefore, in one embodiment, a relaxed version of this problem is solved that is convex. Thus, by changing the data input $H_c$ to this problem, one can selectively cancel any specific reflection combinations. Therefore, backscatter sensor provides additional mechanisms for higher-level applications to remove unwanted reflections which can be a very powerful feature.

Progressive Interference Cancellation (PIC)

Embodiments of the present invention provide accurate backscatter measurement for commodity radios by designing two novel techniques to tackle the limitations of low dynamic range and finite bandwidth available in commodity radios. The algorithm starts by measuring the overall channel response that the backscatter signal has gone through. This is the classic channel estimation that every receiver performs. The details thereof will not be described herein for the sake of brevity. Hereinafter, the h[n] is assumed to be known, where y[n]=x[n]*h[n]. Note that this h[n] is the composite overall response, but embodiments of the present invention break it down into the form where the individual $\tau_i$, $\alpha_i$, $\theta_i$ values corresponding to each of the reflections that make up the overall backscatter channel can be teased out.

By solving the equation (8), all the parameters of the backscatter may be estimated. The above problem is non-linear because the sinc terms in the optimization problem are non-linear. Further, the problem is not convex. So embodiments of the present invention use a piece-wise approach to solve this problem. In other words, embodiments of the present invention focus on a small region in the variable space $\delta\tau$, $\delta\alpha$, $\delta\theta$, approximate the sinc functions in that region by straight lines, and solve the resulting convex optimization problem. The residual error is compared to a threshold value and the process is repeated until successive iterations of the algorithm do not reduce the error any further. The finite bandwidth and the discrete time nature of the channel response are accordingly taken into consideration.

As an example of the application of the parameter estimation algorithm and selective backscatter cancellation technique, progressive interference cancellation (PIC) is disclosed. PIC is a powerful feature of backscatter sensor that can be used for range boosting. When backscatter sensor is operating in an indoor environment, one of the challenges is that some of the reflections in the backscatter may be significantly stronger than the others. For example, if there is a reflector 10 cm away from the transmitter and another reflector that is 10 m away from the transmitter, the difference in signal strengths of these two components can be as high as 60 dB. Practical wireless radios have a typical dynamic range of 60 dB, which would imply that the weaker reflection would get completely buried. Second, even if the weaker reflection is within the dynamic range, it may not be represented with many bits. Hence, the farther reflector experiences a higher quantization noise. Therefore, even if the strong components can be estimated reasonably accurately, the weaker components may not be estimated properly, which may result in inaccurate backscatter parameter estimation.

According to an embodiment, accuracy can be improved if the strongest backscatter components can be progressively removed to allow the estimation algorithm to operate on the remaining components, as shown in FIGS. 6A through 6D. By removing the stronger component, the receiver's dynamic range can be used to sample the weaker components with higher resolution and thus prevent them from being washed out or distorted. Once such strongest components are estimated and removed, the next group of components that are relatively weaker are estimated and removed. The algorithm recursively repeats until all components are estimated.

The challenge therefore is to selectively eliminate backscatter components by canceling them. Furthermore, the cancellation has to be implemented in the analog domain before the receiver, otherwise the dynamic range will be limited. To implement this, the present invention builds on prior work in self-interference cancellation and full duplex radio as described in U.S. application No. 61/864,492. In accordance with the present invention, the backscatter components are selectively and progressively canceled in a controlled manner one by one.

To accomplish this, embodiments of the present invention use the same estimation algorithm described above. The initial estimates are used to find a coarse estimate of where the strong backscatter components are located. The analog cancellation circuit is then tuned to only cancel these components by controlling the delay taps in the circuit to straddle the delay of these strong components. After running the estimation algorithm on the remaining backscatter signal, the analog cancellation is further retuned to cancel the next strongest component and the process is repeated. This cancellation block is referred to as Progressive self-Interference Cancellation (PIC). The analog cancellation may achieve a maximum of 70 dB of cancellation, so progressively canceling backscatter cannot be used beyond a particular level. However, after such cancellation, assuming a receiver dynamic range of at least 60 dB, the remaining components can be easily estimated. Further, the same cancellation and estimation procedure can be repeated in the digital domain by selectively canceling the residual backscatter components.

Figure 6A:
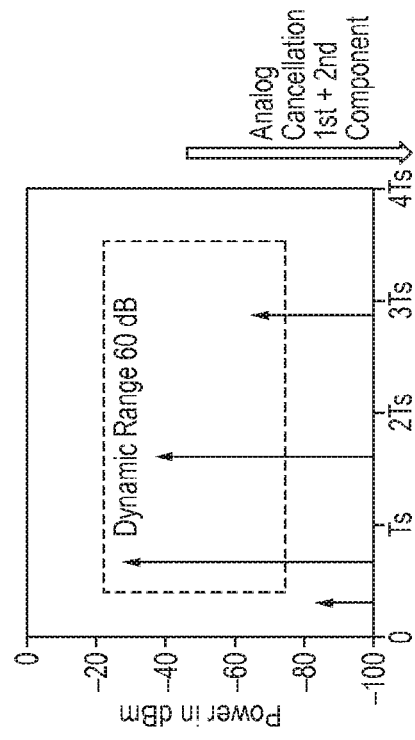
FIGS. 6A through 6D illustrate exemplary graphs illustrating intermediate results of an estimation of the backscatter signal after performing the progressive self-interference cancellation, according to one embodiment of the present invention.
Figure 6B:
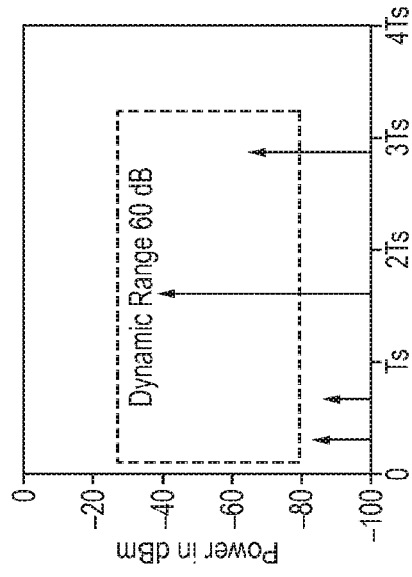

The composite backscatter signal in the example shown in FIG. 6A is shown as having three strong reflections in addition to several smaller reflections. After the first step of progressive self-interference cancellation, the first component is significantly reduced, while the other two strong components with higher delays are hardly affected, as shown in FIG. 6B. Next, the same algorithm is used to also cancel the second component and preserve only the third component. Notice also that although the first and second components are close in amplitude and delay (in fact the delay difference is within the sampling interval), embodiments of the present invention are able to selectively cancel the first and second reflections one after the other and leave the last one alone, as shown in FIG. 6C.

Figure 6D:
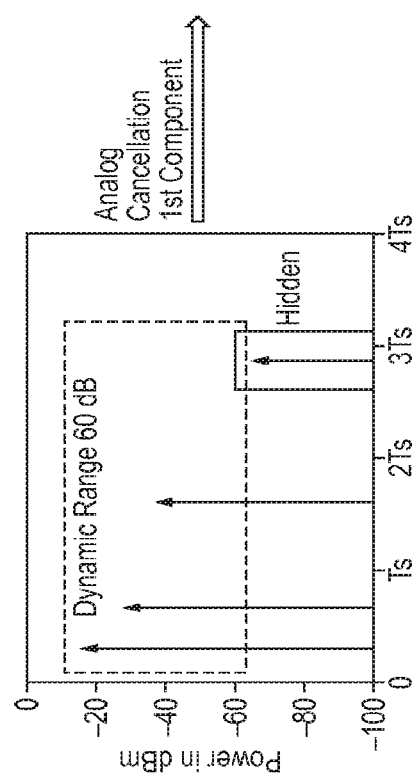
Figure 6C:
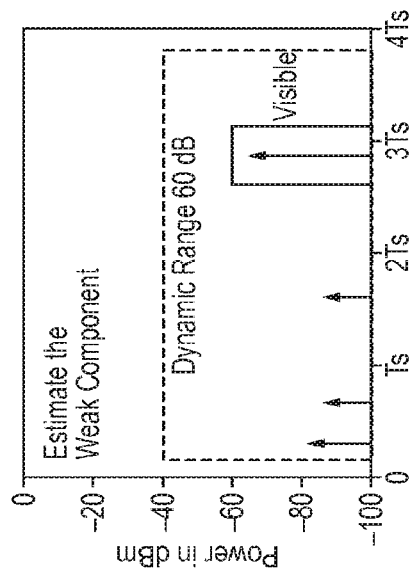

A subsequent analog cancellation step cancels the three strongest backscatter components and that also hits the limit of what analog cancellation is capable of (e.g., 70 dB), as shown in FIG. 6D. However, the same progressive self-interference cancellation technique can be applied to cancel the remaining backscatter components progressively via digital cancellation. The digital cancellation step improves estimation accuracy, but does not improve the dynamic range.

Usually the strength of the backscatter components are weaker for larger values of the delay $\tau$. Hence, according to embodiments of the present invention, the estimation algorithm will be run by partitioning the range for the variable $\tau$ into several consecutive non-overlapping windows. In other words, the overall response of the backscatter signal is partitioned into a multitude of continuous adjacent linear regions, i.e., there is no gap between the approximate linear regions. In an embodiment, the size of the windows can be determined by estimating how far apart the multi-paths are separated. In another embodiment, the size of the windows can be determined by the dynamic range of the receiver. For example, the size of the windows is determined such that no signal components that lie within the window should exceed the dynamic range of the receiver. Therefore, the size of the windows varies dependent on the environment. If the response impulses of the backscatter signal components are closely located and have a large difference in amplitude, then the algorithm will select a small window size. Conversely, if the response impulses of the backscatter signal components are widely located and have a small difference in amplitude, then the algorithm may select a large window size to cover several response impulses under the condition that the amplitude difference among them is within the dynamic range of the receiver.

After partitioning the overall impulse response into a multitude of windows, the algorithm begins by estimating parameters for the reflections in the first time window, then passes that information to the PIC block. The backscatter estimator then removes the strongest components within that window. After the cancellation of these components, the backscatter estimator advances the window one step into the future and then estimates the parameters in that range and pass that information to PIC for cancellation. This process can repeat multiple times until all the backscatter components have been detected in the forward time direction. In an embodiment, the algorithm can set a reasonably high value of τ beyond which the backscatter components present are very weak; this maximum value depends on the application and the environment.

Figure 7:
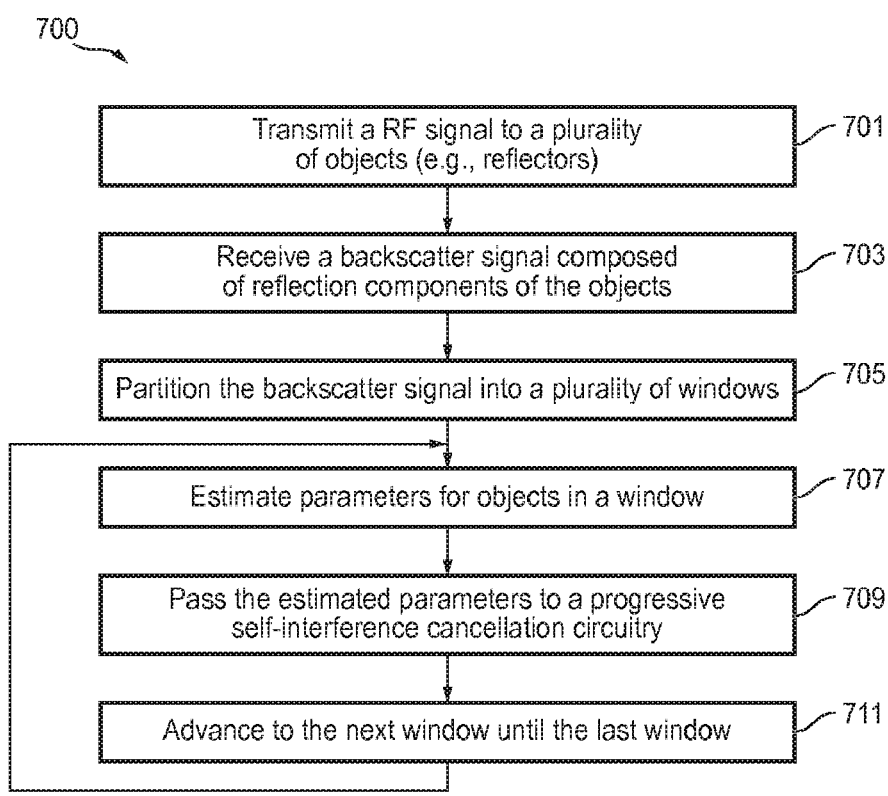
FIG. 7 illustrates exemplary operations that may be performed by a device to estimate backscatter signals, according to one embodiment of the present invention.

FIG. 7 illustrates exemplary operations that may be performed by a device for estimating backscatter signals, according to an embodiment of the present invention. In step 701, a radio frequency (RF) signal is optionally transmitted to a plurality of objects (reflectors) to generate a backscatter signal having a plurality of reflection components associated with the objects. The RF signal is transmitted at a carrier frequency. In another embodiment, the device receives RF signals from external RF sources (e.g., that are transmitted from other sources in the environment such as existing Wi-Fi access points, and the like). In general, the device can either transmit the RF signal itself, or receive backscatter reflections that are caused by transmissions from other devices/sources without departing from the teachings of the present disclosure. The transmission may be through a single antenna and/or through a multiple input multiple output (MIMO) antenna array. In an embodiment, the MIMO antenna array includes a plurality of antennas disposed at half of the length of the carrier frequency.

In step 703, a receiver receives the backscatter signal through the MIMO antenna array. The receiver may have a limited bandwidth, a limited dynamic range, as well as a limited dynamic sampling resolution. The received backscatter signal has thus the shape of a sine function due to the band-limited receiver. In step 705, the receiver partitions the sine function converted backscatter signal into a plurality of approximate linear regions. In an embodiment, the size of the linear regions (also known as window) can be determined in advance and depends from the dynamic range of the receiver. In another embodiment, the size of the linear regions (windows) can be dynamically adjusted according to the environment, e.g., the number and the spatial separation of the multi-paths. The windows are consecutive non-overlapping, i.e., there is no gaps between the consecutive windows to detect all constituent backscatter components.

In step 707, the receiver starts estimating parameters for reflection components of the objects that lie within the first window. The parameters may include the attenuation, the delay time, and the angle of arrival of the reflection components, the Doppler frequency and/or any other parameters. The composite backscatter channel as seen in the m-th receiver in the MIMO antenna array can be modeled according to equation (5). The parameters of the constituent backscatter components can be estimated by solving the optimization expression (6).

In step 709, the estimated parameters are passed to an analog progressive self-interference cancellation block for cancellation of the strongest component within the window. In step 711, the process advances to the next window and estimates parameters for one or more other reflectors in this window until all windows are processed. In general, the progressive interference cancellation technique may be used in either digital domain and/or analog domain.

The foregoing has described the principles, preferred embodiments, and mode of operation of the present invention. The present invention shows how by collecting, measuring and mining the natural backscatter than happens when radios transmit, objects can be detected and located with high accuracy. By implementing the progressive self-interference cancellation and the self-interference cancellation circuitry and techniques in the related application, commodity radios can be converted to measuring devices to measure a backscatter signal and estimate its properties. Based on the estimated properties, a hidden object (e.g., reflector) can be made visible. Embodiments of the present invention provide algorithms to enable commercially available transceivers to take advantage of the backscatter measurements to detect tumors, buried bodies after an earthquake, or hidden weapons (e.g., knifes, guns), to recognize human gestures, to track human motion, to create indoor imaging system, to detect obstacles.

Figure 8:
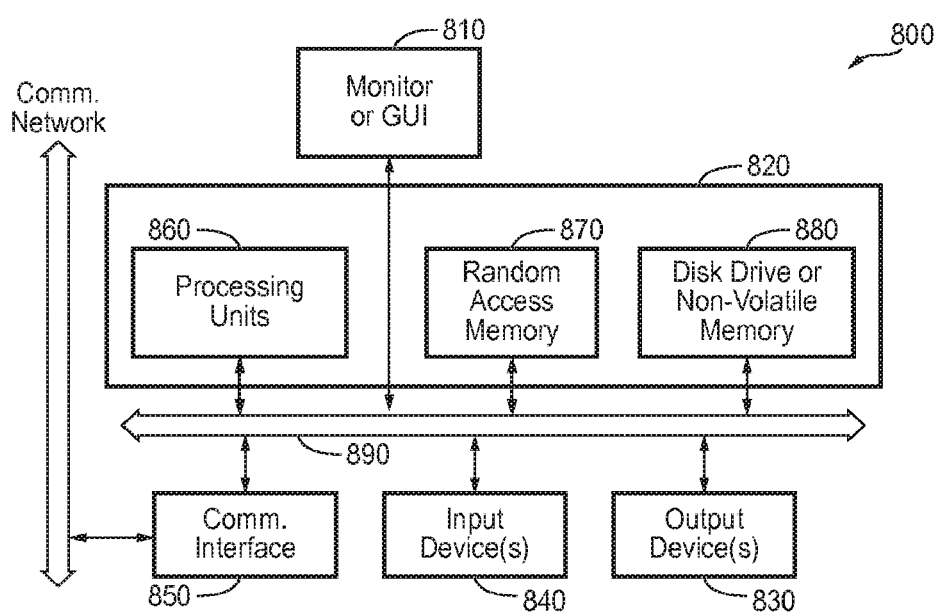
FIG. 8 is a simplified block diagram of an exemplary computer or data processing system in which portions of self-interference cancellation circuit may be embodied.

FIG. 8 is a simplified block diagram of an exemplary computer or data processing system 800 in which portions of analog self-interference cancellation circuit, such as controller 140 shown in FIG. 1, may be embodied. Computer system 800 is shown as including a monitor 810, a computer 820, user output devices 830, user input devices 840, communications interface 850, and the like.

As shown in FIG. 8, computer 820 may include one or more processors or processing units 860 that communicates with a number of peripheral devices via a bus subsystem 890. These peripheral devices may include user output devices 830, user input devices 840, communications interface 850, and a storage subsystem, such as random access memory (RAM) 870 and non-volatile memory 880.

User input devices 830 include all possible types of devices and mechanisms for inputting information to computer system 820. These may include a keyboard, a keypad, a touch screen incorporated into the display, audio input devices such as voice recognition systems, microphones, and other types of input devices. User input devices 830 typically allow a user to select objects, icons, text and the like that appear on the monitor 810 via a command such as a click of a button or the like. User output devices 840 include all possible types of devices and mechanisms for outputting information from computer 820. These may include a display (e.g., monitor 810), non-visual displays such as audio output devices, etc.

Communications interface 850 provides an interface to other communication networks and devices. Communications interface 850 may serve as an interface for receiving data from and transmitting data to other systems. In various embodiments, computer system 800 may also include software that enables communications over a network.

RAM 870 and disk drive 880 are examples of tangible media configured to store data including, for example, executable computer code, human readable code, or the like. Other types of tangible media include floppy disks, removable hard disks, semiconductor memories such as flash memories, non-transitory read-only-memories (ROMS), battery-backed volatile memories, and the like. RAM 870 and non-volatile memory 880 may be configured to store the basic programming and data constructs that provide the functionality described above in accordance with embodiments of the present invention. Software code modules and instructions that provide such functionality may be stored in RAM 870 and/or non-volatile memory 880. These software modules may be executed by processor(s) 860. RAM 870 and non-volatile memory 880 may also provide a repository for storing data used in accordance with embodiments of the present invention.

RAM 870 and non-volatile memory 880 may include a number of memories including a main random access memory (RAM) for storage of instructions and data during program execution and a read only memory (ROM) in which fixed non-transitory instructions are stored. RAM 870 and non-volatile memory 880 may include a file storage subsystem providing persistent (non-volatile) storage for program and data files. RAM 870 and non-volatile memory 880 may also include removable storage systems, such as removable flash memory.

Bus subsystem 890 provides a mechanism for enabling the various components and subsystems of computer 820 communicate with each other as intended. Although bus subsystem 890 is shown schematically as a single bus, alternative embodiments of the bus subsystem may utilize multiple busses.

Various embodiments of the present invention may be implemented in the form of logic in software or hardware or a combination of both. The logic may be stored in a computer readable or machine-readable non-transitory storage medium as a set of instructions adapted to direct a processor of a computer system to perform the functions described above in accordance with embodiments of the present invention. Such logic may form part of a computer adapted to direct an information-processing device to perform the functions described above.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices or other media, now known or later developed, that are capable of storing code and/or data. Various circuit blocks of the embodiments of the present invention described above may be disposed in an application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. For example, the various embodiments of the present inventions are not limited to the use antennas, transmit and/or receive chain elements, cancellation circuits, transceivers, digital to analog converters, analog to digital converters. Other modifications and variations will be apparent to those skilled in the art and are intended to fall within the scope of the appended claims.

What is claimed is:

1. A backscatter sensor, comprising:
   a receiver for receiving a composite signal comprising one or more reflections of a transmitted signal, each reflection being reflected by one of a plurality of objects; and
   a processor configured to:
     estimate at least a first backscatter component of the composite signal using a progressive interference cancellation technique, wherein the first backscatter component of the composite signal corresponds to a reflection of the transmitted signal from a first object;
     remove the estimated first backscatter component from the composite signal to generate a second signal; and
     estimate a second backscatter component using the second signal, the second backscatter component corresponding to a reflection of the transmitted signal from a second object.

2. The backscatter sensor of claim 1, wherein the receiver further comprises:
   a plurality of receive antennas, each receive antenna being coupled to a receive chain, wherein each receive chain receives a modified copy of the composite signal.

3. The backscatter sensor of claim 1, further comprising:
   a transmitter for transmitting the transmitted signal, and wherein the processor further receives a sample of the transmitted signal.

4. The backscatter sensor of claim 3, wherein the transmitter comprises one or more transmitters, each transmitter transmitting a signal.

5. The backscatter sensor of claim 1, wherein the processor is further configured to estimate at least one of an amplitude of the first backscatter component, a phase of the first backscatter component and a time delay between transmission of the transmitted signal and reception of the first backscatter component.

6. The backscatter sensor of claim 1, wherein the first object is the closest object to the receiver among the plurality of objects.

7. The backscatter sensor of claim 1, wherein the processor is further configured to estimate one or more parameters associated with at least the first backscatter component using a linear optimization technique.

8. The backscatter sensor of claim 7, wherein the processor is further configured to estimate the one or more parameters in accordance with the following expression:

$$\text{minimize} \quad \sum_m \sum_n \| h_m[n] - \tilde{h}_m[n] \|^2$$

$$\text{subject to} \quad \tau_k \geq 0, \alpha_k \leq 1,$$

$$\theta_k \in \left[\frac{-\pi}{2}, \frac{\pi}{2}\right], v_k \in [-\pi, \pi],$$

$$k = \{1, \ldots, L\}, n = \{-N, \ldots, N\},$$

$$m = \{1, \ldots, M\}$$

wherein $\tilde{h}$ represents an estimated channel response, M represents number of antennas, L represents number of reflected backscatter components, $\alpha_k$ represents an attenuation undergone by the $k^{th}$ backscatter component, $v_k$ represents a phase rotation seen by the $k^{th}$ backscatter component, $\tau_k$ represents a delay between the $k^{th}$ backscatter component and a corresponding transmitted signal, and $\Theta_k$ represents an angle of arrival of $k^{th}$ backscatter component.

9. The backscatter sensor of claim 1, wherein the receiver is further configured to receive the composite signal during a plurality of consecutive non-overlapping time windows, and the processor is further configured to:
- estimate one or more parameters of the first backscatter component based at least on a first portion of the composite signal received in a first window; and
- iteratively estimate parameters of a next backscatter component based on a second portion of the composite signal received in a next consecutive window.

10. The backscatter sensor of claim 9, wherein the consecutive non-overlapping windows have a variable size.

11. The backscatter sensor of claim 1, wherein the processor is further configured to estimate the at least the first backscatter component using a Sequential Convex Programming (SCP) algorithm.

12. The backscatter sensor of claim 11, wherein the processor is further configured to generate an initial estimate for the SCP algorithm using a continuous basis pursuit (CBP) algorithm.

13. The backscatter sensor of claim 1, wherein the processor is further configured to estimate the at least the first backscatter component using a continuous basis pursuit (CBP) algorithm.

14. The backscatter sensor of claim 1, wherein the processor is further configured to estimate a Doppler frequency corresponding to each object.

15. A method for sensing backscatter signals, comprising:
- receiving a composite signal comprising one or more reflections of a transmitted signal, each reflection being reflected by one of a plurality of objects; and
- estimating at least a first backscatter component of the composite signal using a progressive interference cancellation technique, wherein the first backscatter component of the composite signal corresponds to a reflection of the transmitted signal from a first object;
- removing the estimated first component from the composite signal to generate a second signal; and
- estimating a second backscatter component using the second signal, the second backscatter component corresponding to a reflection of the transmitted signal from a second object.

16. The method of claim 15, further comprising:
receiving a plurality of composite signals by a plurality of receive antennas, each receive antenna being coupled to a receive chain.

17. The method of claim 15, further comprising:
transmitting one or more signals using one or more transmit antennas; and
estimating one or more backscatter components corresponding to each transmitted signal.

18. The method of claim 15, wherein estimating at least a first backscatter component comprises estimating at least one of an amplitude of the first backscatter component, a phase of the backscatter component, and a time delay between transmission of the transmitted signal and reception of the first backscatter component, time of flight of the first backscatter component.

19. The method of claim 15, wherein the first object is the closest object to the receiver among the plurality of objects.

20. The method of claim 15, further comprising:
estimating one or more parameters associated with at least the first backscatter component using a linear optimization technique.

21. The method of claim 20, wherein the linear optimization technique comprises solving the following expression:

$$\text{minimize} \quad \sum_m \sum_n \| h_m[n] - \tilde{h}_m[n] \|^2$$
$$\text{subject to} \quad \tau_k \geq 0, \alpha_k \leq 1,$$
$$\theta_k \in \left[\frac{-\pi}{2}, \frac{\pi}{2}\right], v_k \in [-\pi, \pi],$$
$$k = \{1, \ldots, L\}, n = \{-N, \ldots, N\},$$
$$m = \{1, \ldots, M\}$$

wherein $\hat{h}$ represents an estimated channel response, M represents number of antennas, L represents number of reflected backscatter components, $\alpha_k$ represents an attenuation undergone by the $k^{th}$ backscatter component, $v_k$ represents a phase rotation seen by the $k^{th}$ backscatter component, $\tau_k$ represents a delay between the $k^{th}$ backscatter component and a corresponding transmitted signal, and $\Theta_k$ represents an angle of arrival of $k^{th}$ backscatter component.

22. The method of claim 15, further comprising:
receiving the composite signal during a plurality of consecutive non-overlapping time windows; and
estimating one or more parameters of the first backscatter component based at least on a first portion of the composite signal received in a first window; and
iteratively estimating parameters of a next backscatter component based on a second portion of the composite signal received in a next consecutive window.

23. The method of claim 22, wherein the consecutive time windows correspond to different sizes.

24. The method of claim 15, further comprising:
estimating the at least the first backscatter component using a Sequential Convex Programming (SCP) algorithm.

25. The method of claim 24, further comprising:
generating an initial estimate for the SCP algorithm using a continuous basis pursuit (CBP) algorithm.

26. The method of claim 15, further comprising:
estimating the at least the first backscatter component using a continuous basis pursuit (CBP) algorithm.

27. The method of claim 15, further comprising:
estimating a Doppler frequency corresponding to each object.

* * * * *

UNITED STATES PATENT AND TRADEMARK OFFICE
CERTIFICATE OF CORRECTION

| | |
|---|---|
| PATENT NO. | : 11,163,050 B2 |
| APPLICATION NO. | : 15/033889 |
| DATED | : November 2, 2021 |
| INVENTOR(S) | : Bharadia |

It is certified that error appears in the above-identified patent and that said Letters Patent is hereby corrected as shown below:

In the Specification

Please add the below Statement of Government Sponsored Support title and paragraph to Column 1, above the Field of Invention at Line 23:
STATEMENT OF GOVERNMENT SPONSORED SUPPORT
This invention was made with Government support under contract 0832820 awarded by the National Science Foundation. The Government has certain rights in the invention.

Signed and Sealed this
Fourteenth Day of October, 2025

John A. Squires
*Director of the United States Patent and Trademark Office*